(12) United States Patent
Lee et al.

(10) Patent No.: US 12,512,704 B2
(45) Date of Patent: Dec. 30, 2025

(54) APPARATUS AND METHOD ENABLING OUT-BAND COMMUNICATION IN WIRELESS CHARGING APPARATUS, METHOD AND SYSTEM

(71) Applicant: LG ELECTRONICS INC., Seoul (KR)

(72) Inventors: Minsoo Lee, Seoul (KR); Jingu Choi, Seoul (KR); Jinkwon Lim, Seoul (KR); Jaehyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 739 days.

(21) Appl. No.: 17/794,872

(22) PCT Filed: Jan. 29, 2020

(86) PCT No.: PCT/KR2020/001349
§ 371 (c)(1),
(2) Date: Jul. 22, 2022

(87) PCT Pub. No.: WO2021/153815
PCT Pub. Date: Aug. 5, 2021

(65) Prior Publication Data
US 2023/0084679 A1    Mar. 16, 2023

(51) Int. Cl.
*H02J 50/80* (2016.01)
*H02J 50/10* (2016.01)
*H02J 50/60* (2016.01)
*H02J 50/90* (2016.01)

(52) U.S. Cl.
CPC ............ *H02J 50/80* (2016.02); *H02J 50/10* (2016.02); *H02J 50/60* (2016.02); *H02J 50/90* (2016.02)

(58) Field of Classification Search
CPC ....................................................... H02J 50/80
See application file for complete search history.

(56) References Cited

U.S. PATENT DOCUMENTS 9,530,558 B2 * 12/2016 Nakano .................... H01F 38/14
11,848,572 B2 * 12/2023 Kim ......................... H02J 50/12
12,278,507 B2 *  4/2025 Park ......................... H02J 50/40
(Continued)

FOREIGN PATENT DOCUMENTS

KR    10-2018-0009294 A    1/2018
KR         20180009294   *   1/2018
(Continued)

OTHER PUBLICATIONS

KR 20180009294_translation,Park, Foreign Object Detection Method And Apparatus And System Therefor (Year: 2018).*

*Primary Examiner* — Tynese V McDaniel
(74) *Attorney, Agent, or Firm* — BRYAN CAVE LEIGHTON PAISNER LLP

(57) ABSTRACT

The present specification relates to an apparatus and method enabling different types of communication between a wireless power transmission apparatus and a wireless power reception apparatus. The present specification provides a wireless power transmission apparatus, a wireless power transmission method, a wireless power reception apparatus, a wireless power reception method, and a wireless charging system capable of quickly providing a user with information according to a change in a charging status.

5 Claims, 30 Drawing Sheets

(56) References Cited

U.S. PATENT DOCUMENTS

| | | | |
|---|---|---|---|
| 2012/0115549 A1* | 5/2012 | Kim | H02J 50/80 |
| | | | 455/566 |
| 2012/0212070 A1 | 8/2012 | Tanabe | |
| 2012/0280575 A1* | 11/2012 | Kim | H02J 7/00047 |
| | | | 307/104 |
| 2012/0281547 A1* | 11/2012 | Kim | H02J 50/80 |
| | | | 370/242 |
| 2012/0286726 A1* | 11/2012 | Kim | H02J 50/005 |
| | | | 320/108 |
| 2014/0125287 A1* | 5/2014 | Nakano | H02J 7/00034 |
| | | | 307/104 |
| 2019/0190320 A1* | 6/2019 | Park | H02J 50/80 |
| 2019/0222073 A1* | 7/2019 | Lee | H02J 7/0031 |
| 2020/0382167 A1* | 12/2020 | Park | H04B 5/263 |
| 2021/0320745 A1* | 10/2021 | Kim | H02J 50/402 |
| 2021/0351627 A1* | 11/2021 | Park | H04B 5/79 |
| 2022/0247230 A1* | 8/2022 | Kim | H02J 50/60 |
| 2022/0294272 A1* | 9/2022 | Lee | H02J 50/60 |
| 2023/0084679 A1* | 3/2023 | Lee | H02J 50/10 |
| | | | 320/108 |

FOREIGN PATENT DOCUMENTS

| | | |
|---|---|---|
| KR | 20190015953 A | 2/2019 |
| KR | 20190050301 A | 5/2019 |
| KR | 20190082891 A | 7/2019 |
| KR | 20190087033 A | 7/2019 |
| WO | 2018144392 A1 | 8/2018 |
| WO | 2020017859 A1 | 1/2020 |

\* cited by examiner

FIG. 3b

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

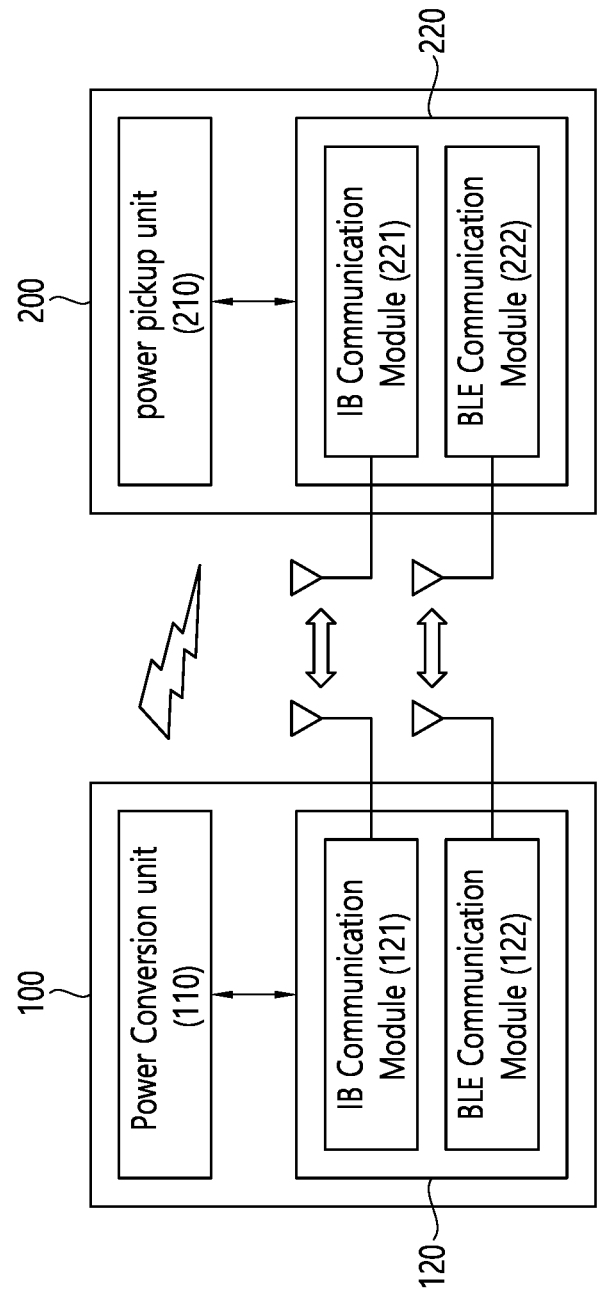

FIG. 10

| Preamble | ZERO | Response | Type | Info | Parity |

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 12

| | b7 | b6 | b5 | b4 | b3 | b2 | b1 | b0 |
|---|---|---|---|---|---|---|---|---|
| B0 | Certificate Structure Version ||||||||
| B1 | Reserved |||| Certificate Type ||||
| B2 | Signature Offset ||||||||
| B3 ... B11 | MSB Serial Number LSB ||||||||
| B12 ... B17 | Issuer ID ||||||||
| B18 ... B23 | Subject ID ||||||||
| B24 ... B56 | Public Key ||||||||
| — | Future extensions may have additional field in this area ||||||||
| B signature_offset ... B signature_offset+63 | Signature ||||||||

FIG. 13

| | b7 | b6 | b5 | b4 | b3 | b2 | b1 | b0 |
|---|---|---|---|---|---|---|---|---|
| B0 | Power Class | | Guaranteed Power Value | | | | | |
| B1 | Reserved | | | Potential Power Value | | | | |
| B2 | AI | AR | OB | Reserved | | | WPID | Not Res Sens |

FIG. 14

| | b7 | b6 | b5 | b4 | b3 | b2 | b1 | b0 |
|---|---|---|---|---|---|---|---|---|
| B0 | Power Class | | | Maximum Power value | | | | |
| B1 | Reserved | | | | | | | |
| B2 | Prop | AI | AR | OB | ZERO | | Count | |
| B3 | Window Size | | | | | Window Offset | | |
| B4 | Neg | Polarity* | Depth* | | | Reserved | | |

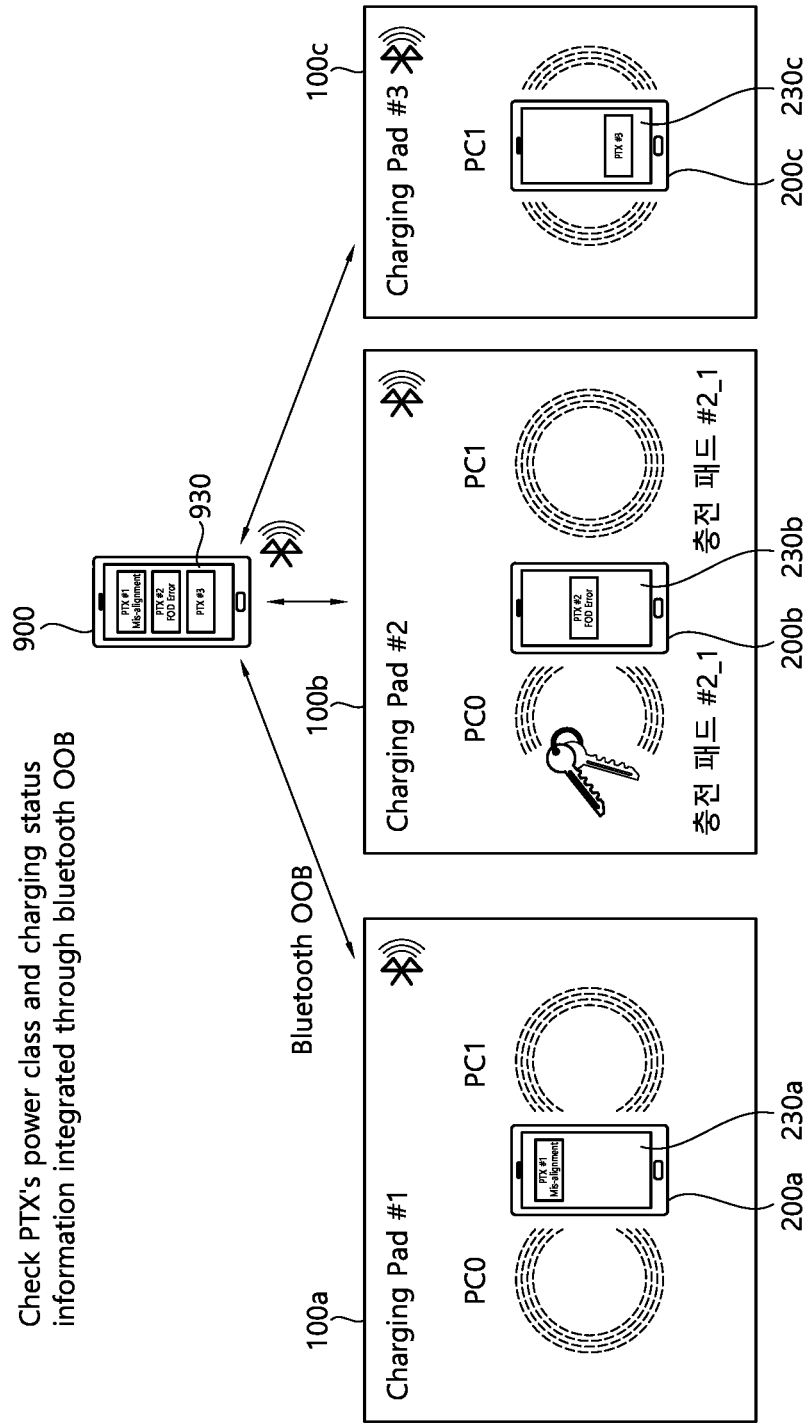

APPARATUS AND METHOD ENABLING OUT-BAND COMMUNICATION IN WIRELESS CHARGING APPARATUS, METHOD AND SYSTEM

CROSS-REFERENCE TO RELATED APPLICATION

This application is the National Stage filing under 35 U.S.C. 371 of International Application No. PCT/KR2020/001349, filed on Jan. 29, 2020, the contents of which are all hereby incorporated by reference herein in their entirety.

BACKGROUND OF THE DISCLOSURE

Field of the Disclosure

The present specification relates to an apparatus and method capable of heterogeneous communication between a wireless power transmitter and a wireless power receiver.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

An object of the present specification is to provide a wireless power transmission device, a wireless power transmission method, a wireless power reception device, a wireless power reception method, and a wireless charging system that can quickly provide information according to a change in a charging state to a user.

In one aspect, a wireless power transmitter, a wireless power receiver, a wireless power transfer method, a wireless power receiver, and a wireless power transfer system capable of exchanging information on a charging state through out-band communication are disclosed.

In addition, in a situation where in-band communication is not possible due to a change in the charging state, disclosed are a wireless power transmission device, a wireless power reception device, a wireless power transmission method, a wireless power reception method, and a wireless power transmission system that can transmit information on a charging state through out-band communication and display it to a user.

By exchanging information about the charging state through out-band communication even when in-band communication is not possible between the wireless power receiver and the wireless power transmitter, when a problem occurs, the cause of the problem can be identified and displayed to the user so that problems occurring during charging can be quickly solved.

BRIEF DESCRIPTION OF THE DRAWINGS

FIG. 3b shows an example of a WPC NDEF in a wireless power transfer system.

FIG. 4c is a block diagram illustrating a wireless power transfer system using BLE communication according to an example.

FIG. 10 is a structure of a sync pattern according to an exemplary embodiment of the present disclosure.

FIG. 12 is a block diagram showing a wireless charging certificate format according to an exemplary embodiment of the present disclosure.

FIG. 13 is a capability packet structure of a wireless power transmitter according to an exemplary embodiment of the present disclosure.

FIG. 14 is a configuration packet structure of a wireless power receiver according to an exemplary embodiment of the present disclosure.

FIG. 26 is a diagram illustrating an example of displaying information generated in each wireless power transfer system to a user during power transfer according to an embodiment.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented.

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
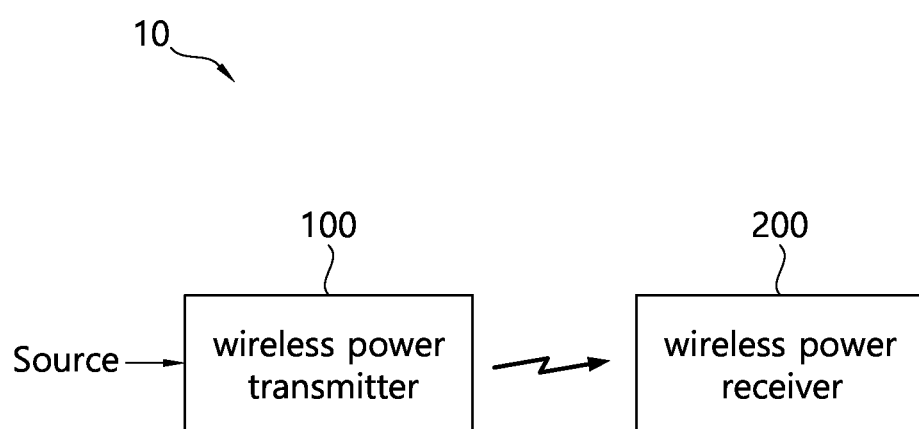
FIG. 1 is a block diagram of a wireless power system according to an embodiment.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
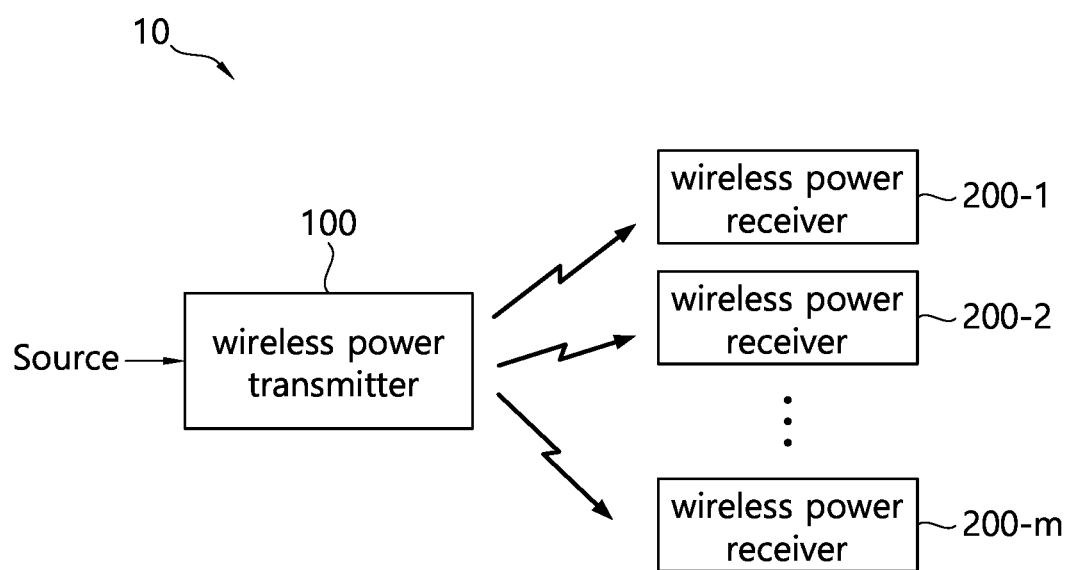
FIG. 2 is a block diagram of a wireless power system according to another embodiment.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
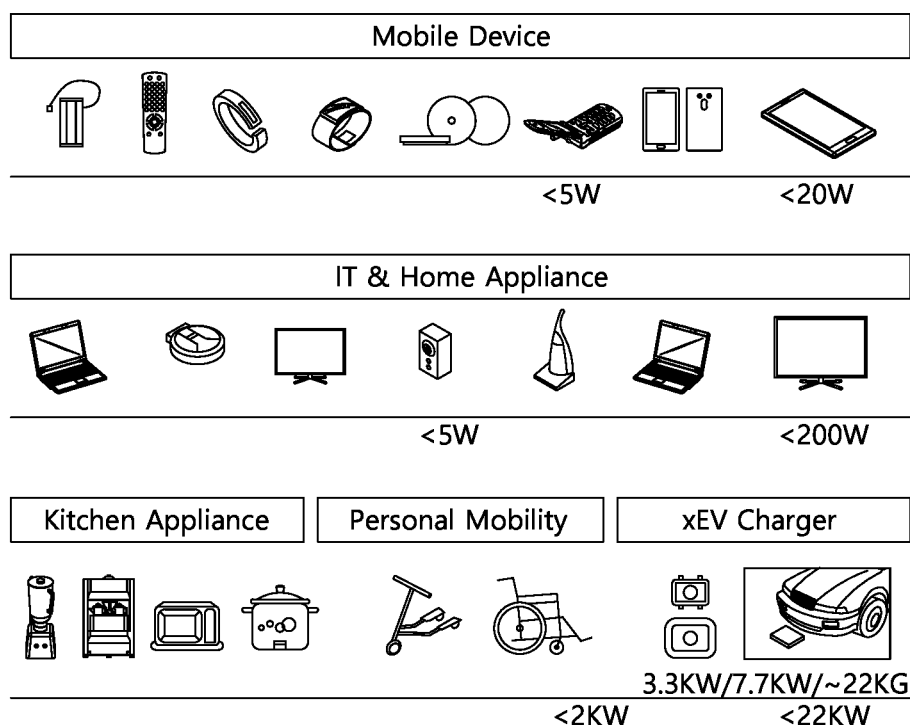
FIG. 3a shows an exemplary embodiment of diverse electronic devices adopting a wireless power transfer system.

FIG. 3a illustrates an embodiment of various electronic devices to which a wireless power transmission system is introduced.

In the FIG. 3a, the electronic devices included in the wireless power transfer system are sorted in accordance with the amount of transmitted power and the amount of received power. Referring to FIG. 3a, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5W. The application of PC-1 includes wearable devices, such as smart watches.

The PC0 standard relates to wireless power transmitters and receivers providing a guaranteed power of 5W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30

W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF). For example, as shown in FIG. 3B, WPC NDEF may include an application profile field (e.g., 1B), a version field (e.g., 1B), and profile specific data (e.g., 1B). The application profile field indicates whether the device is i) mobile and computing, ii) powered tools, and iii) kitchen, the upper nibble of the version field indicates the major version and a lower nibble indicates a minor version. Profile-specific data also defines the content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

Figure 4A:
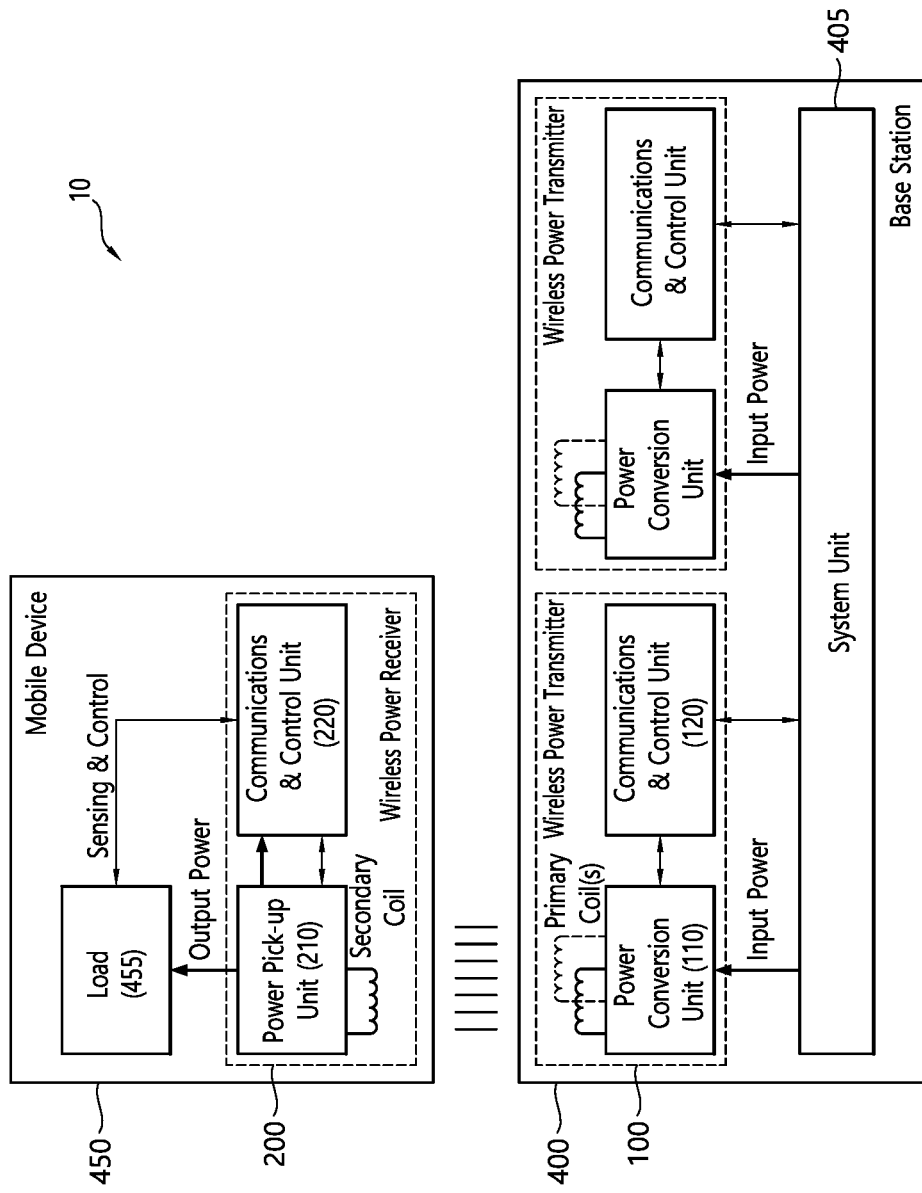
FIG. 4a is a block diagram of a wireless power transfer system according to another exemplary embodiment of the present disclosure.

As shown in Table 1, a maximum output power capability of Class n PTU may be equal to or greater than the $P_{TX\_IN\_MAX}$ of the corresponding class. The PRU cannot draw a power that is higher than the power level specified in the corresponding category. FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 4B:
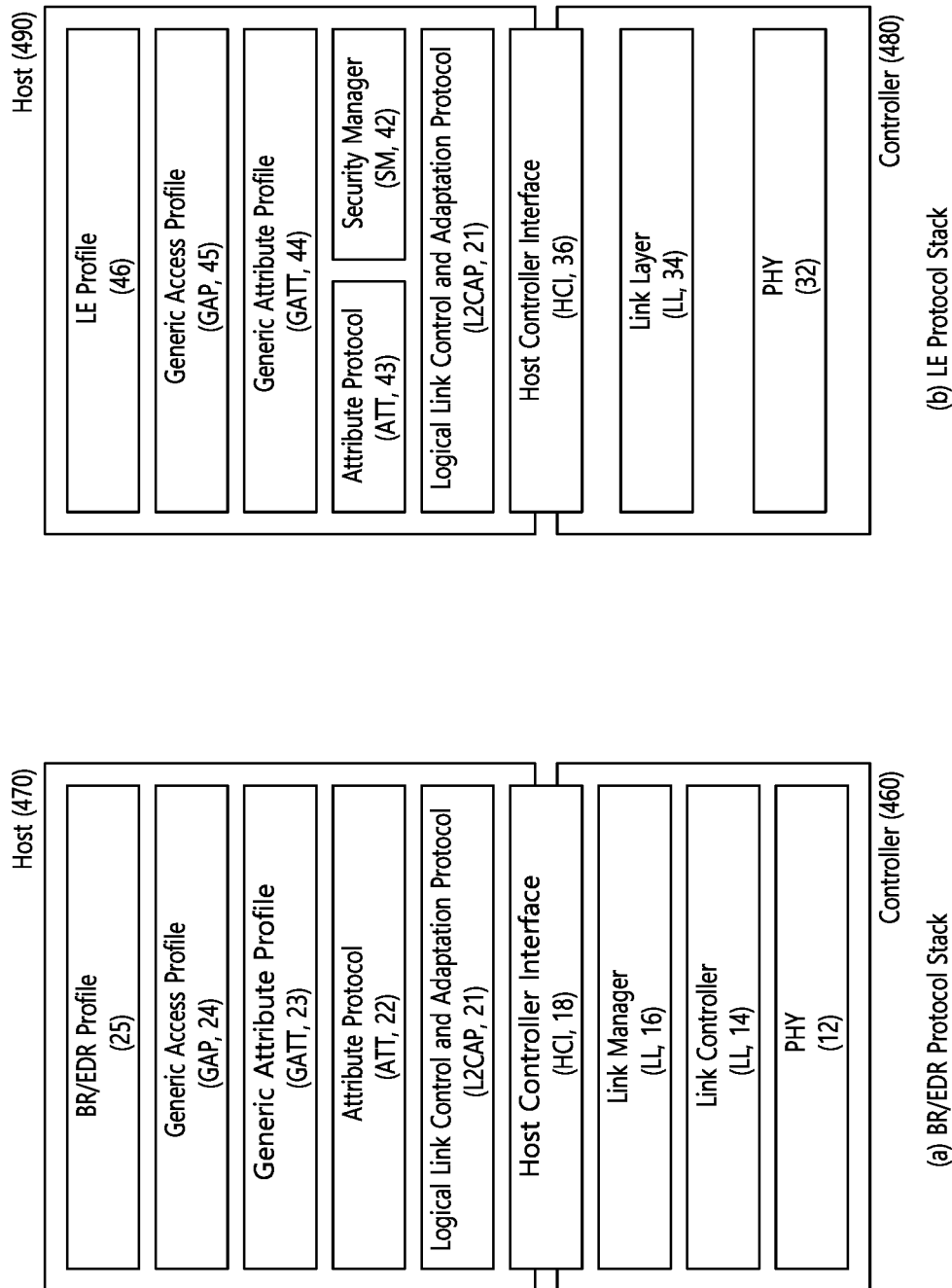
FIG. 4b is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4b.

FIG. 4b is a diagram illustrating an example of a Bluetooth communication architecture to which an embodiment according to the present disclosure may be applied.

Referring to FIG. 4b, (a) of FIG. 4b shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4b, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4b, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method
② Time: Time information exchanging method
③ FindMe: Provision of alarm service according to distance
④ Proximity: Battery information exchanging method
⑤ Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4a, The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4c.

FIG. 4c is a block diagram illustrating a wireless power transfer system using BLE communication according to an example.

Referring to FIG. 4c, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4b. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
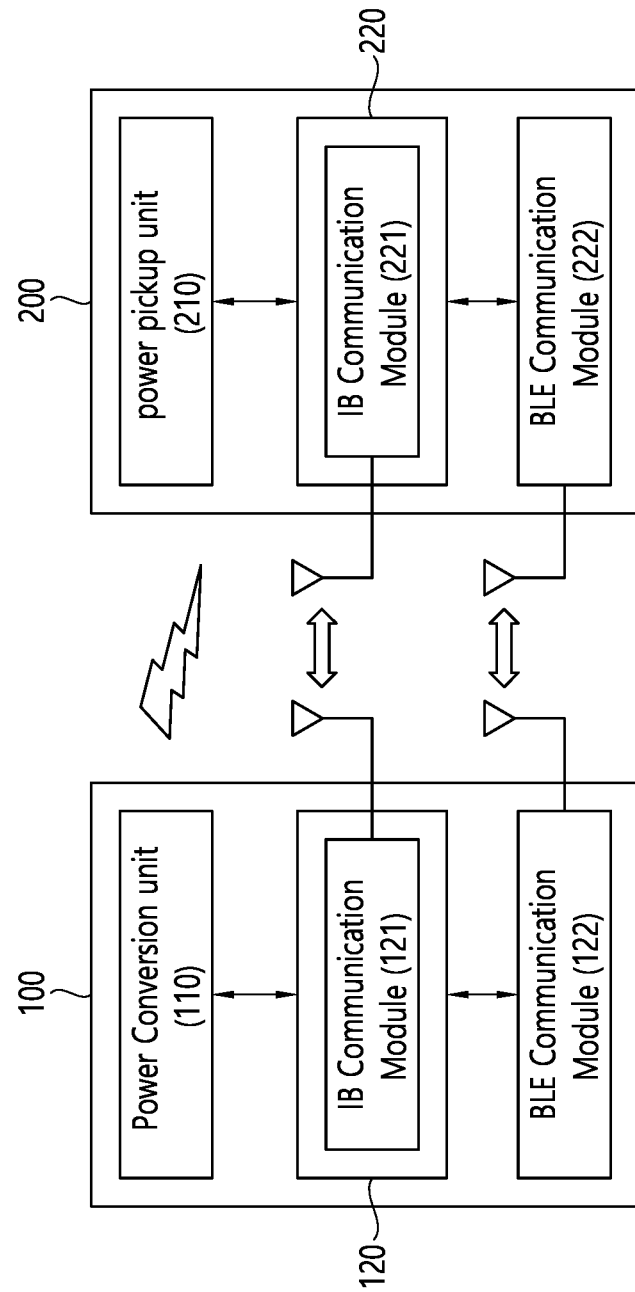
FIG. 4d is a block diagram illustrating a wireless power transfer system using BLE communication according to another example.

On the other hand, the communication/control circuits 120 and 220 include only in-band communication modules 121 and 221, respectively, as shown in FIG. 4D, the BLE communication modules 122 and 222 may be provided separately from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 5:
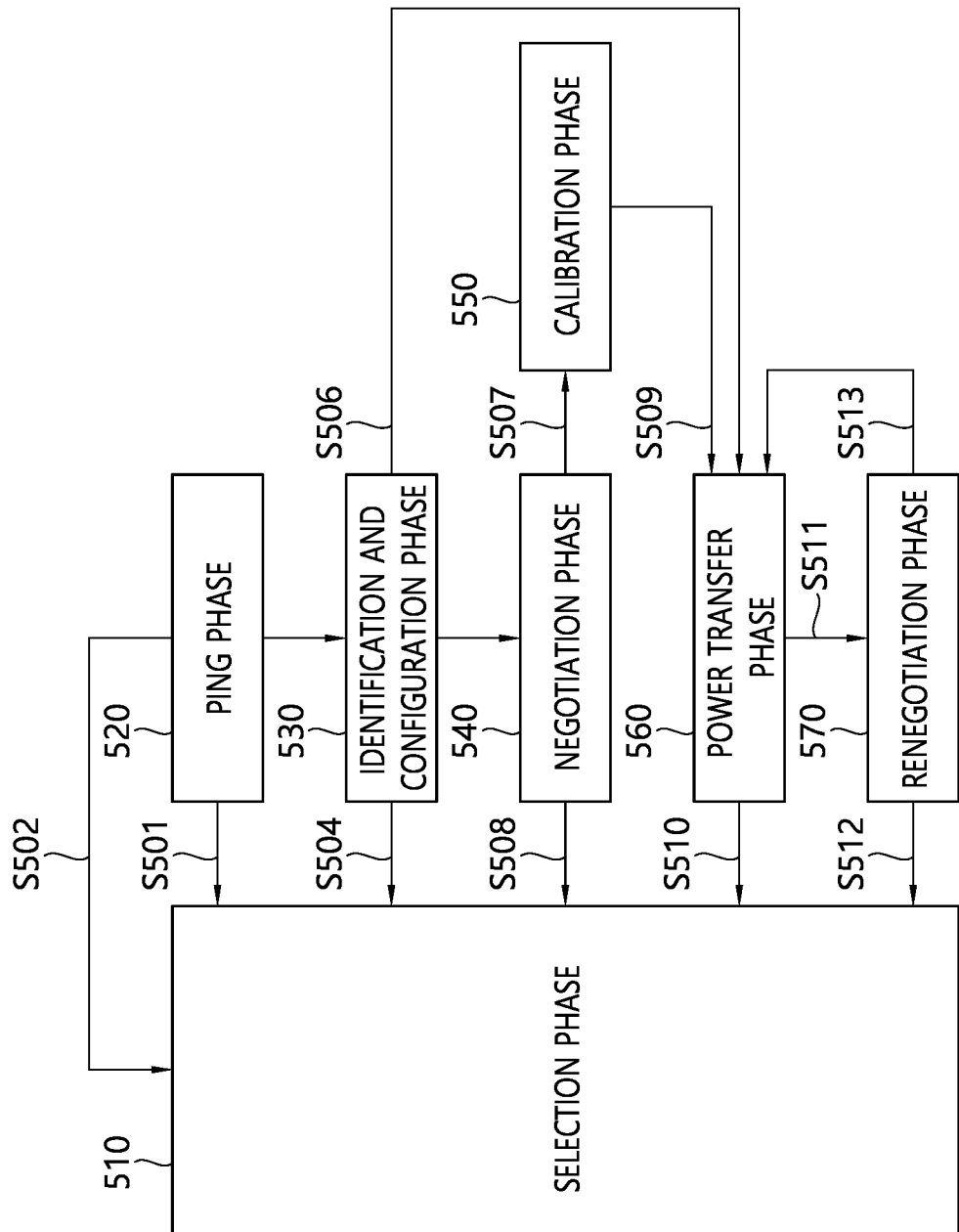
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the presence or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
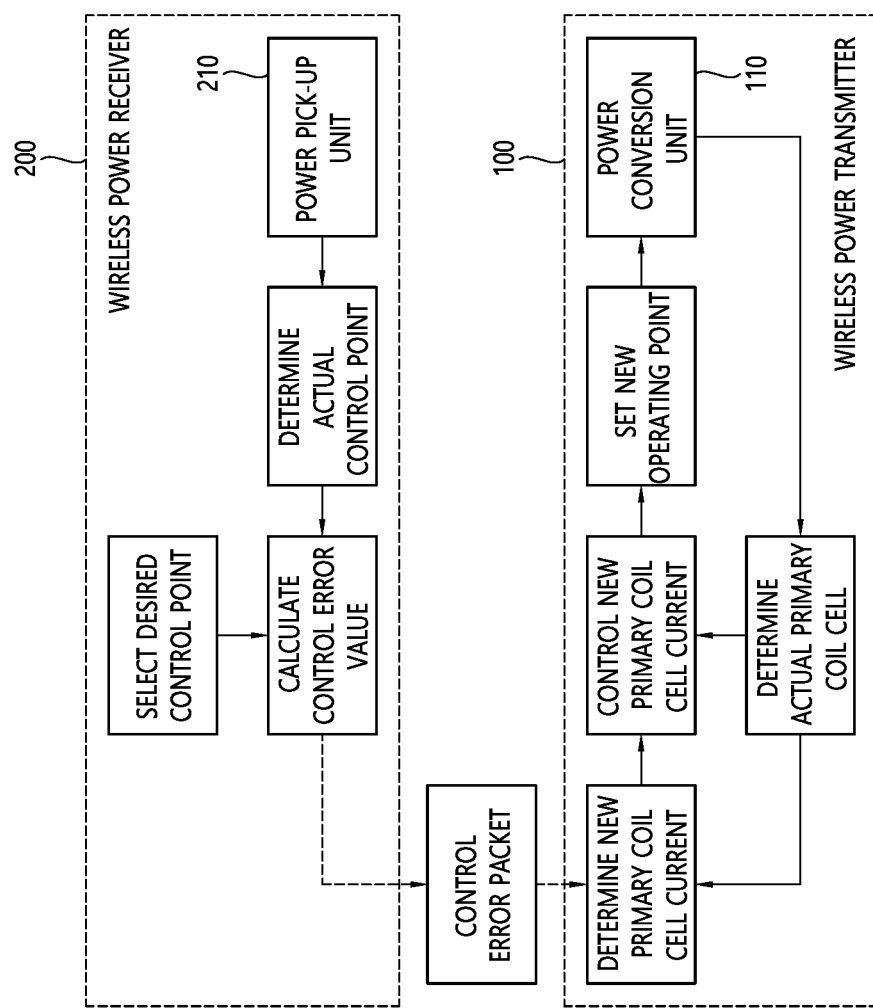
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
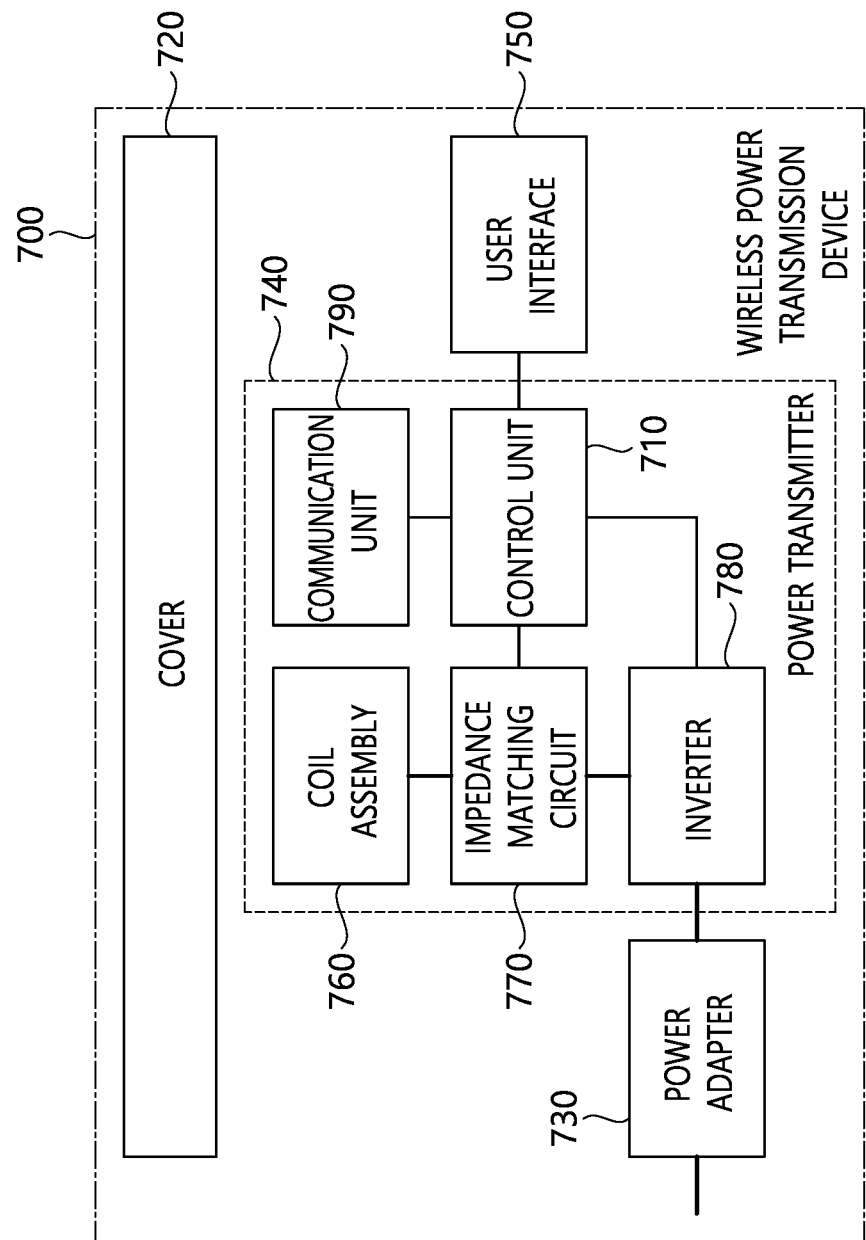
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver.

The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
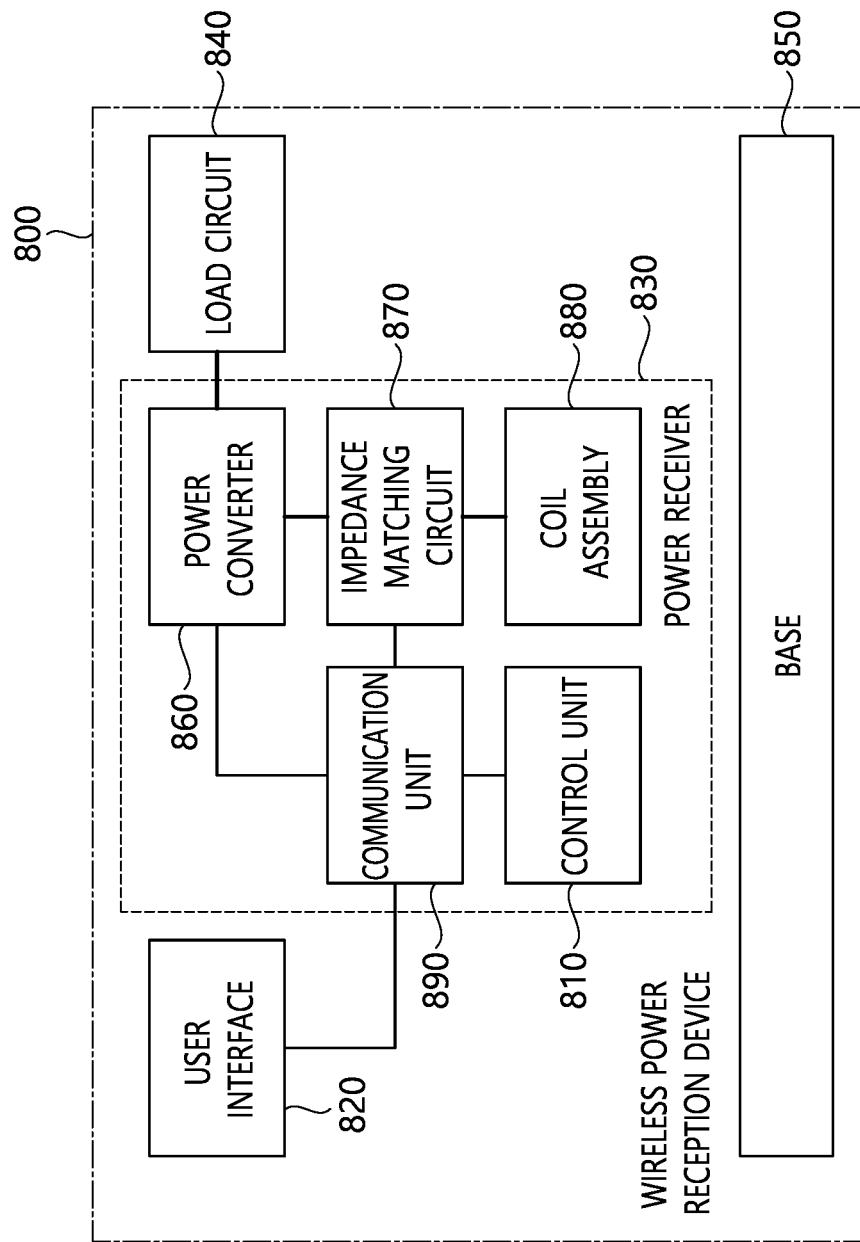
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
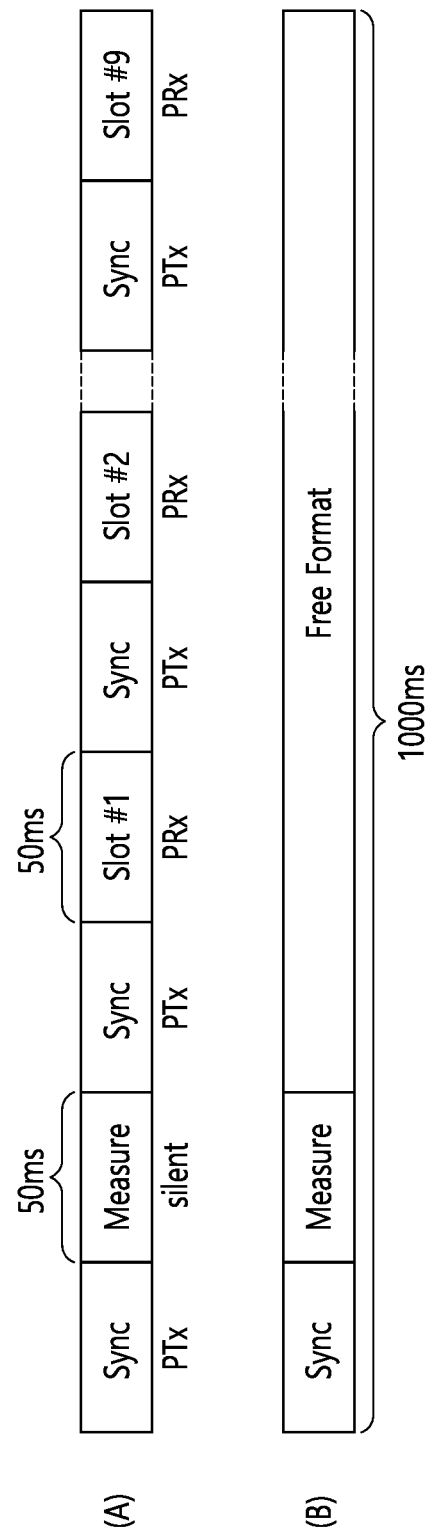
FIG. 9 shows a communication frame structure according to an exemplary embodiment of the present disclosure.

FIG. 9 shows a communication frame structure according to an exemplary embodiment of the present disclosure. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present disclosure.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern may be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that may be freely used by a random wireless power receiver, the information field is given a value of '10'.

Figure 11:
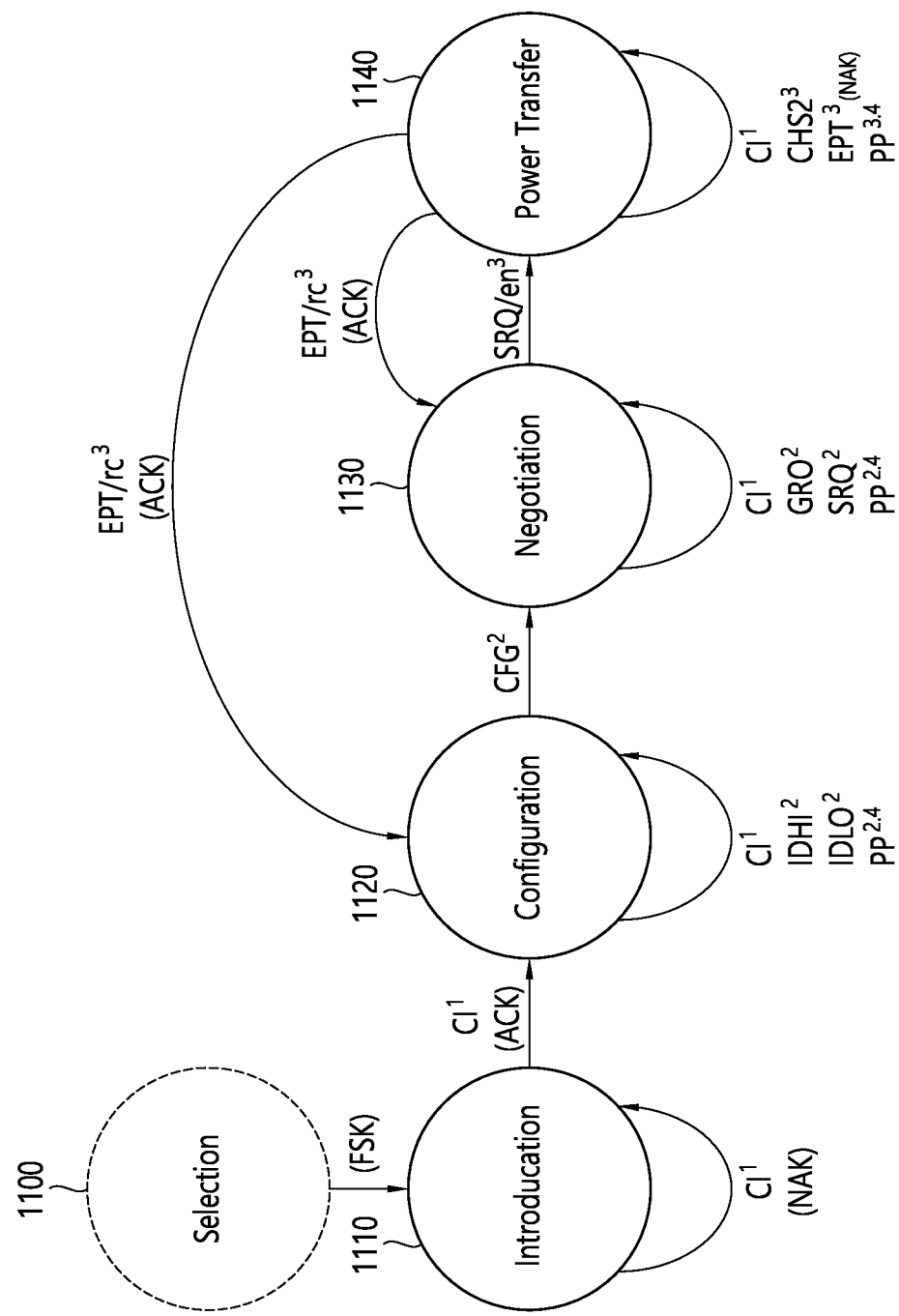
FIG. 11 shows operation statuses of a wireless power transmitter and a wireless power receiver in a shared mode according to an exemplary embodiment of the present disclosure.

FIG. 11 shows operation statuses of a wireless power transmitter and a wireless power receiver in a shared mode according to an exemplary embodiment of the present disclosure.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NAK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, authentication between a wireless power transmitter and a wireless power receiver will be disclosed.

The wireless power transfer system using in-band communication may use USB-C authentication. The authentication may include an authentication of the wireless power transmitter that is performed by the wireless power receiver (i.e., PTx Authentication by PRx), and an authentication of the wireless power receiver that is performed by the wireless power transmitter (PRx Authentication by PTx).

FIG. 12 is a block diagram showing a wireless charging certificate format according to an exemplary embodiment of the present disclosure.

Referring to FIG. 12, wireless charging certificate format may include wireless charging standard certificate structure version (Qi Authentication Certificate Structure Version), spare bit, certificate type, signature offset, serial number, issuer ID, subject ID, public key and signature.

The certificate type is, for example, 3 bits, which may indicate that the corresponding certificate is any one of a root certificate/intermediate certificate/leaf certificate, it may indicate that it is a certificate about a wireless power transmitter or a certificate about a wireless power receiver, it may represent all of them.

For example, the certificate type is 3 bits, and may represent information about a Root Certificate, a Manufacturer/Secondary Certificate, and a Product Unit Certificate (for the Power Transmitter, etc., respectively). More specifically, when the certificate type is '001'b, it represents a root certificate, and when it is '010'b, it represents an intermediate certificate, in the case of '111'b, it may indicate a leaf certificate of the wireless power transmitter. In addition, when the certificate type is '011'b, it may indicate a leaf certificate of the wireless power receiver.

The wireless power transmitter may notify (or announce) whether or not it supports the authentication function to the wireless power receiver by using a capability packet (in case of an authentication of the wireless power transmitter by the wireless power receiver (authentication of PTx by PRx)). Meanwhile, the wireless power receiver may notify (or announce) whether or not it supports the authentication function to the wireless power transmitter by using a capability packet (in case of an authentication of the wireless power receiver by the wireless power transmitter (authentication of PRx by PTx)). Hereinafter, a structure of indication information (a capability packet and a configuration packet) related to whether or not a device supports the authentication function will be disclosed and described in detail.

FIG. 13 is a capability packet structure of a wireless power transmitter according to an exemplary embodiment of the present disclosure.

Referring to FIG. 13, a capability packet having a respective header value of 0X31 is assigned with 3 bytes. Herein, a first byte (B0) includes a power class and a guaranteed power value, a second byte (B1) includes a reserved field and a potential power field, and a third byte (B2) includes an Authentication Initiator (AI), an Authentication Responder (AR), a reserved field, a WPID, and a Not Res Sens field. More specifically, the Authentication Initiator (AI) is assigned with 1 bit. Herein, for example, if the value is equal to '1b', this may indicate that the corresponding wireless power transmitter may operate as the authentication initiator. Additionally, the Authentication Responder (AR) is also assigned with 1 bit. Herein, for example, if the value is equal to '1b', this may indicate that the corresponding wireless power transmitter may operate as the authentication responder.

FIG. 14 is a configuration packet structure of a wireless power receiver according to an exemplary embodiment of the present disclosure.

Referring to FIG. 14, a capability packet having a respective header value of 0X51 is assigned with 5 bytes. Herein, a first byte (B0) includes a power class and a maximum power value, a second byte (B1) includes an AI, an AR, a reserved field, a third byte (B2) includes a Prop, a reserved field, a ZERO field, and a Count field, a fourth value (B3) includes a Window size and a window offset, and a fifth byte (B4) includes a Neg field, a polarity field, a Depth field, an authentication field (Auth), and a reserved field. More specifically, the Authentication Initiator (AI) is assigned with 1 bit. Herein, for example, if the value is equal to '1b', this may indicate that the corresponding wireless power receiver may operate as the authentication initiator. Additionally, the Authentication Responder (AR) is also assigned with 1 bit. Herein, for example, if the value is equal to '1b', this may indicate that the corresponding wireless power receiver may operate as the authentication responder.

A message that is used during the authentication procedure is referred to as an authentication message. The authentication message is used for carrying information related to authentication. Herein, 2 different types of authentication messages exist. One type corresponds to an authentication request, and another type corresponds to an authentication response. The authentication request is transmitted by the authentication initiator, and the authentication response is transmitted by the authentication responder. Both the wireless power transmitter and the wireless power receiver may be the authentication initiator or the authentication responder. For example, in case the wireless power transmitter is the authentication initiator, the wireless power receiver becomes the authentication responder. And, in case the wireless power receiver is the authentication initiator, the wireless power transmitter becomes the authentication responder.

An authentication request message includes a GET_DIGESTS (i.e., 4 bytes), a GET_CERTIFICATE (i.e., 8 bytes), and a CHALLENGE (i.e., 36 bytes).

An authentication response message includes a DIGESTS (i.e., 4+32 bytes), a CERTIFICATE (i.e., 4+certificate chain (3×512 bytes)=1,540 bytes), a CHALLENGE_AUTH (i.e., 168 bytes), and an ERROR (i.e., 4 bytes).

An authentication message may be referred to as an authentication packet and may also be referred to as authentication data or authentication control information. Additionally, messages, such as GET_DIGEST, DIGESTS, and so on, may also be referred to as a GET_DIGEST packet, a DIGEST packet, and so on.

Figure 15:
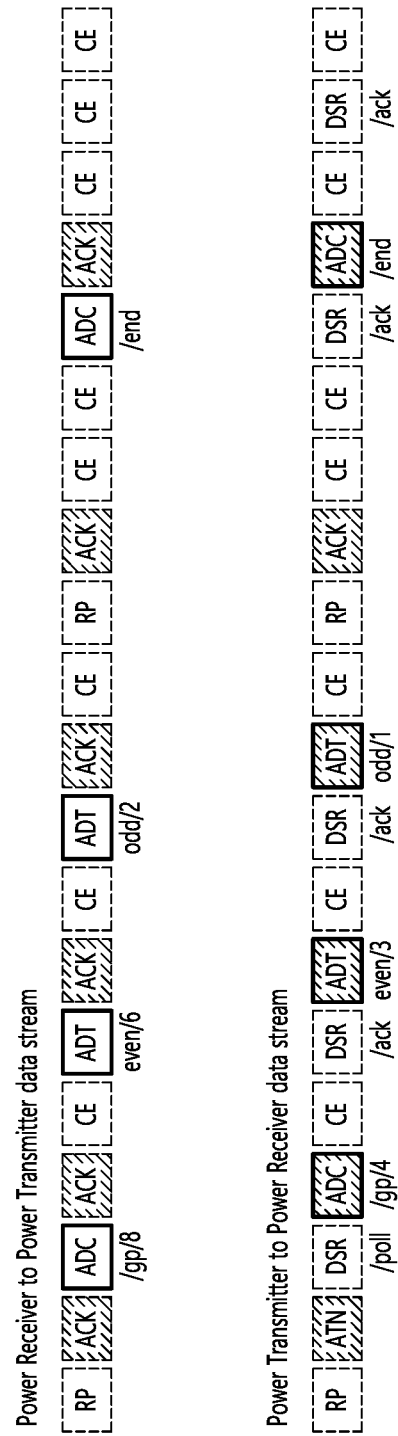
FIG. 15 shows an application-level data stream between a wireless power transmitter and a receiver according to an example.

FIG. 15 shows an application-level data stream between a wireless power transmitter and a receiver according to an example.

Referring to FIG. 15, a data stream may include an auxiliary data control (ADC) data packet and/or an auxiliary data transport (ADT) data packet.

The ADC data packet is used to open a data stream. The ADC data packet may indicate the type of a message included in a stream and the number of data bytes. Meanwhile, the ADT data packet is sequences of data including an actual message. An ADC/end data packet is used to indicate the end of the stream. For example, the maximum number of data bytes in a data transport stream may be limited to 2047.

ACK or NAC (NACK) is used to indicate whether the ADC data packet and the ADT data packet are normally received. Control information necessary for wireless charging such as a control error packet (CE) or DSR may be transmitted between transmission timings of the ADC data packet and the ADT data packet.

Using this data stream structure, authentication related information or other application level information may be transmitted and received between the wireless power transmitter and the wireless power receiver.

In a wireless power transmission system, communication between a wireless power transmitter and a receiver generally uses an amplitude shift keying (ASK) method using a magnetic field change or a frequency shift keying (FSK) method using a frequency change. However, since the transmission rates of ASK and FSK are only a few kHz and are vulnerable to electrical and magnetic disturbances, ASK and FSK are not suitable for medium-power transmission or large-capacity data transmission such as authentication required in an advanced wireless power transmission system. Therefore, in order to support various applications of wireless power transmission, a method for selecting various communication protocols between a wireless power transmitter and a receiver is required. In the present specification, outband communication and out-of-band (OOB) communication have a difference in expression but are substantially the same terms, and hereinafter, out-band communication will be uniformly described.

Hereinafter, a switching operation between in-band communication and out-band communication is referred to as handover. In particular, the operation in which the wireless power transmitter and receiver switch from in-band communication to out-band communication is called handover to out-band, the operation of switching from out-band communication to in-band communication is called handover to in-band. Out-band communication may include, for example, Bluetooth or Bluetooth Low Energy (BLE), or NFC. The handover connection procedure may include a procedure for establishing an out-band communication connection when the out-band communication (i.e. BLE) module receives a handover message from the in-band communication module. Here, the handover message may be a message instructing the in-band communication module (or control unit) to initiate a wireless connection for exchanging information related to wireless power transfer to the out-band communication module.

In order for out-band communication to be applied to the wireless power transfer system, it needs to be modified to fit the unique characteristics of the wireless power transfer system. For example, in consideration of the characteristics of information exchanged between the wireless power transmitter and the receiver (e.g. Is it urgent information, is it only transmitted when the status is changed, whether large amounts of information need to be exchanged in a short time, etc.), the message type, format, and procedures according to the existing out-band communication should be redesigned. In this way, various applications of wireless power can be supported by defining the configuration information, control information, management information, and procedures related to the exchange of wireless power transfer as an out-band communication protocol.

Hereinafter, in the present specification, out-band communication will be specifically described as BLE by way of example. However, in the embodiments described based on BLE, it is apparent to those skilled in the art that embodiments in which BLE is replaced with other out-band communication also fall within the technical spirit of the present document.

Figure 16:
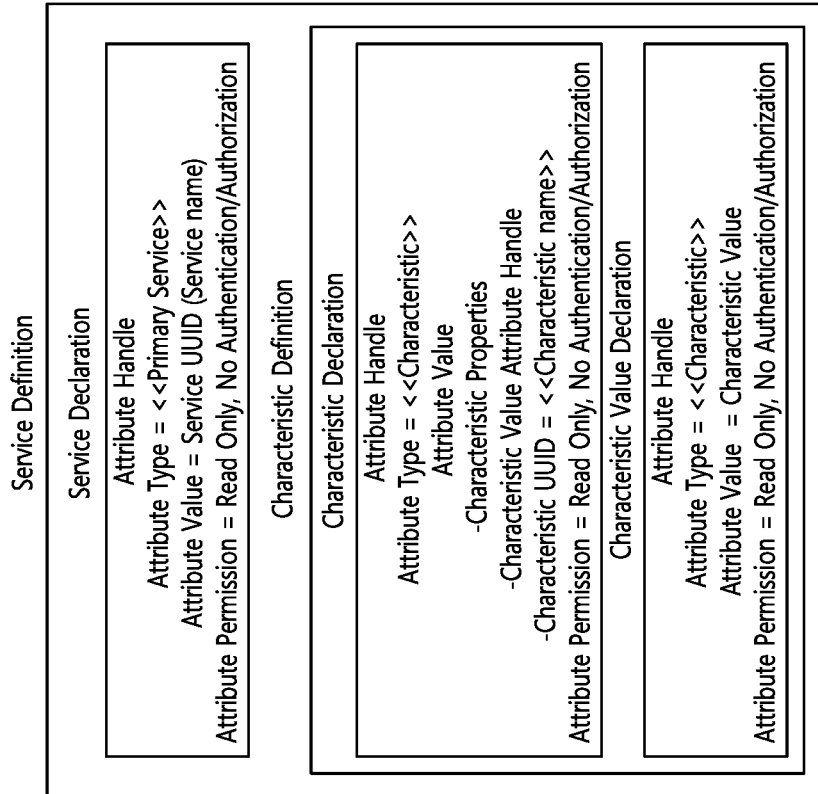
FIG. 16 shows data representation, operation form, and system architecture of BLE.
Figure 16:
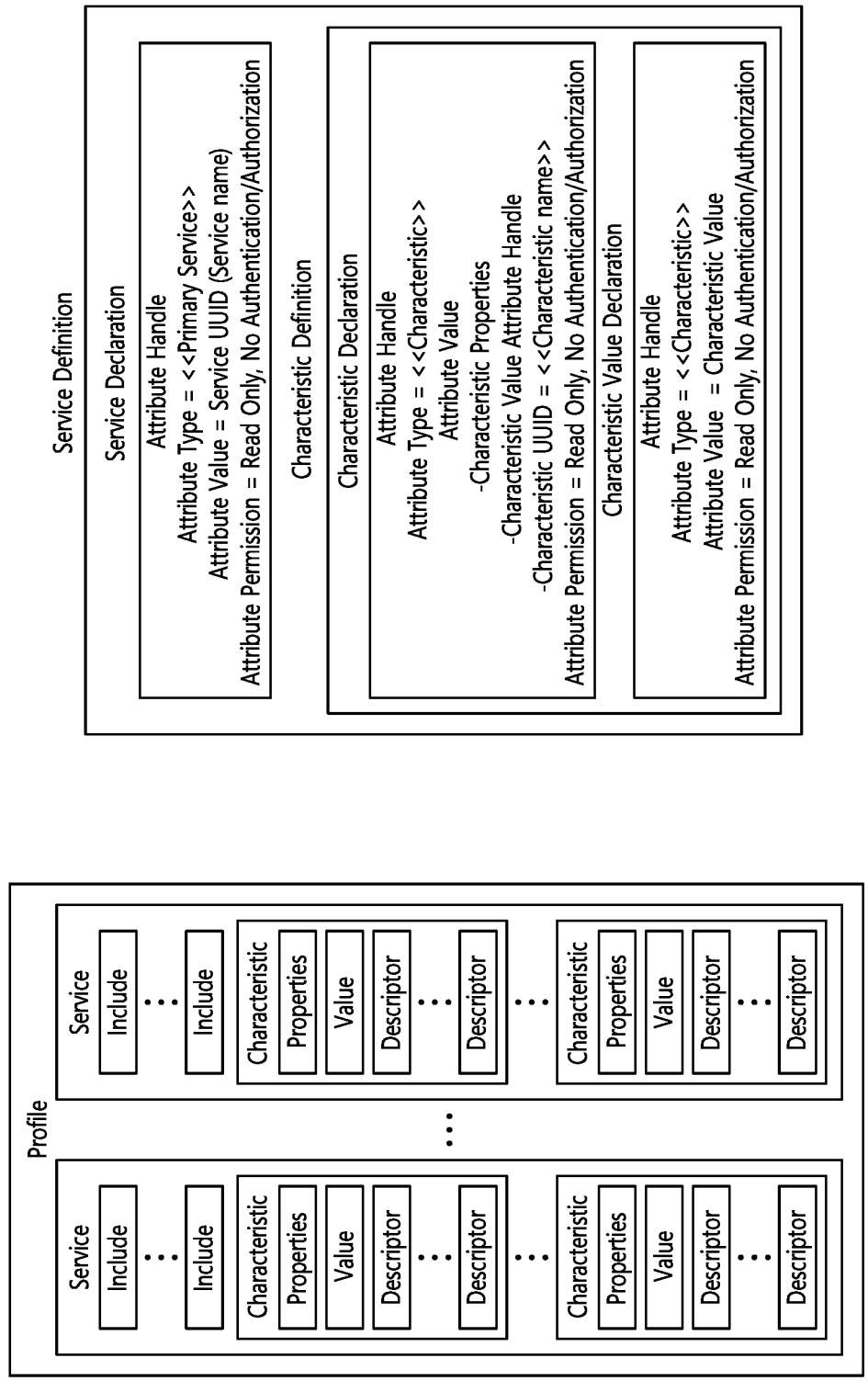

Considering the data representation, operation form, system architecture or environment of BLE as shown in FIG. 16, a method of implementing or applying a wireless power transfer system to BLE as BLE may include various embodiments.

As an example, in terms of EIoB data processing (Data Handling) using BLE GATT, without defining a profile dedicated to wireless power transfer, only a wireless power transfer (WPT) service (WPT service: WPTS) can be defined. In this case, the WPTS is subordinated as an EIoB service in a specific profile.

Figure 17:
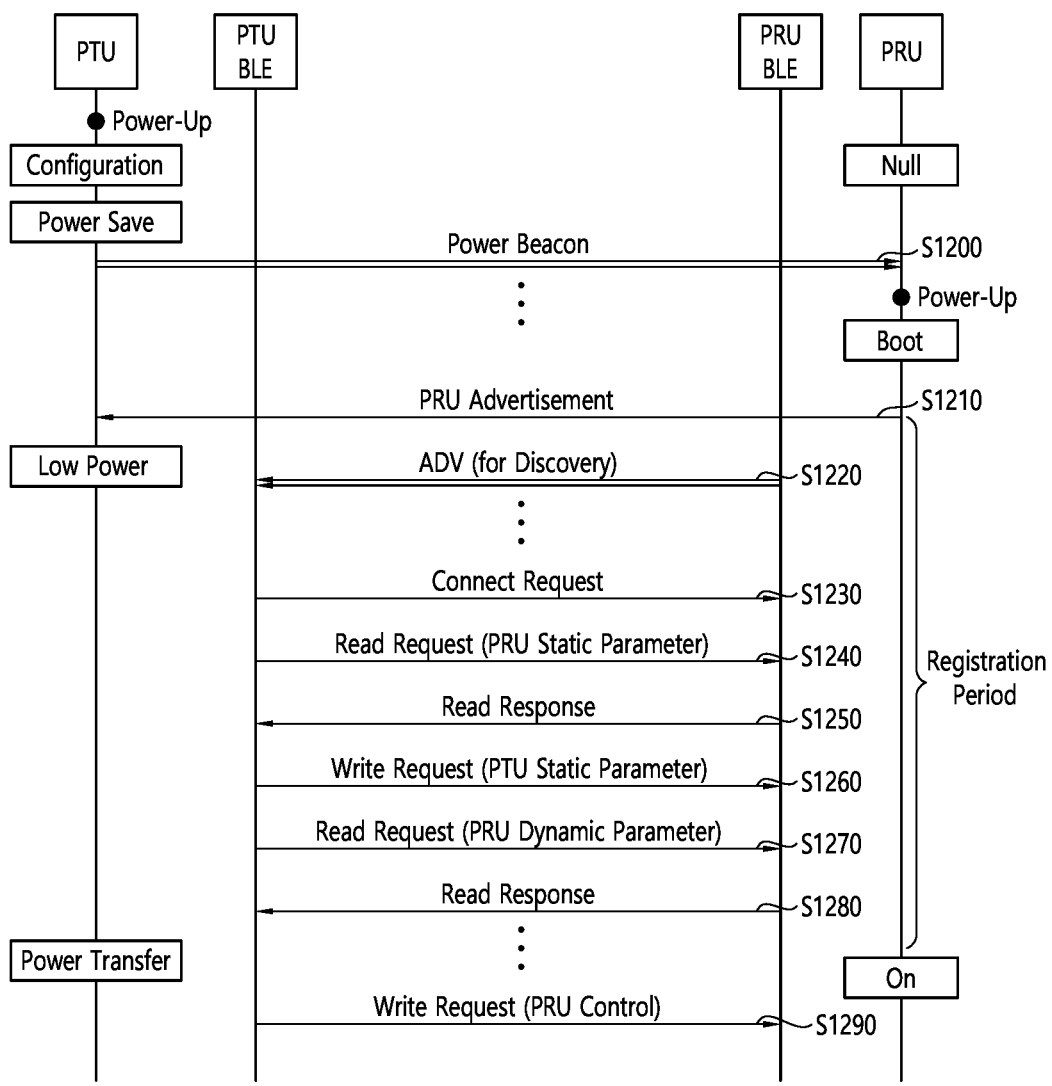
FIG. 17 is a flowchart illustrating a method in which a wireless power transmitter and a wireless power receiver exchange wireless charging-related information in an out-band or in-band according to an embodiment.
Figure 18:
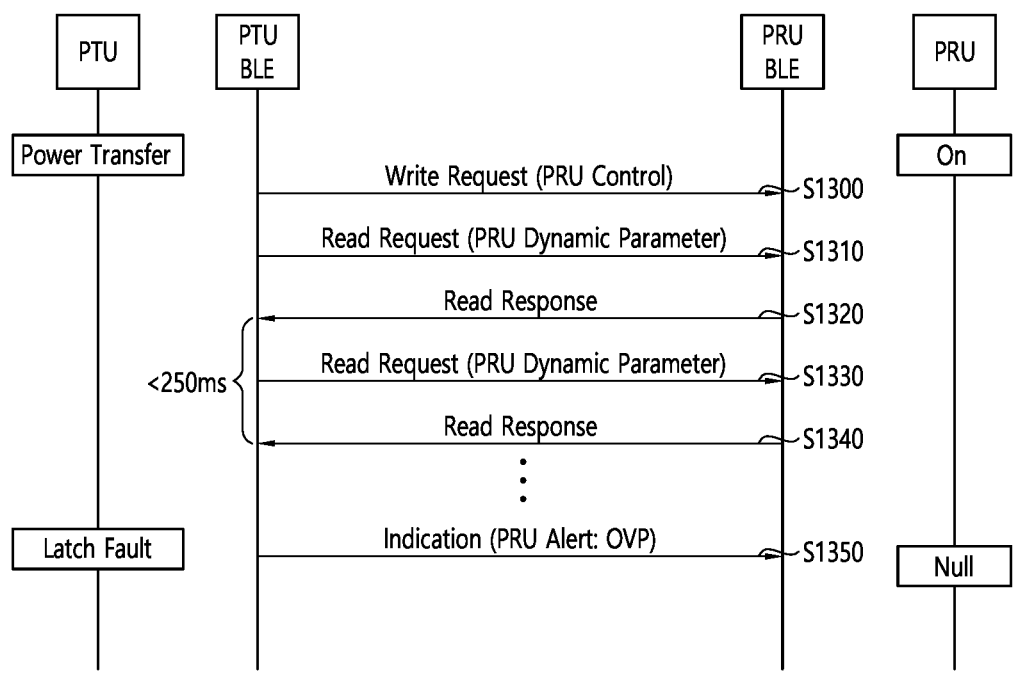
FIG. 18 is a flowchart illustrating a method by which a wireless power receiver notifies an error to a wireless power transmitter according to an embodiment.

FIG. 17 is a flowchart illustrating a method in which a wireless power transmitter and a wireless power receiver exchange wireless charging-related information in an out-band or in-band according to an embodiment, FIG. 18 is a flowchart illustrating a method by which a wireless power receiver notifies an error to a wireless power transmitter according to an embodiment.

FIGS. 17 and 18, PTU means a power transfer circuit, and PRU means a power receiving circuit. The information transmission method in FIGS. 17 and 18 may be a method according to Alliance for Wireless Power (A4WP) or AFA standard technology.

First, referring to FIG. 17, when the power of the PTU is turned on, the PTU enters a power save state through a configuration state that is an initial setting stage.

In the power save state, the PTU transmits a power beacon to the PRU (S1200). The power save state is maintained until the PTU receives an advertisement from the PRU.

When the power of the PRU is turned on and booting, the PRU sends a PRU advertisement (S1210). The PTU that has received the PRU advertisement enters a Low Power Sate.

When the BLE module of the PTU receives an advertisement packet (Advertising packet, ADV) for discovery from the BLE module of the PRU in the low power state (S1220), in order to establish a BLE connection with the PRU, a connection request is transmitted to the PRU (S1230).

In a state where BLE communication between the PTU and the PRU is possible, the PTU reads the PRU static parameters of the PRU through a read request and a read response message (S1240, S1250). Here, the PRU static parameter includes state information of the PRU.

In addition, the PTU transmits PTU static parameter information containing its capabilities information to the PRU through a write request message (S1260).

After exchanging the static parameter information, the PTU periodically receives PRU dynamic parameter information measured in the PRU through a read request and a read response (S1270, S1280). Here, the PRU dynamic parameters include voltage information, current information, temperature information, and the like.

When the PTU informs the PRU to charge or controls permission of the PRU, the PRU may perform PRU control using a write request (S1290).

Referring to FIG. 18, the PTU may control the PTU through a write request in the power transfer state (S1300). In addition, PRU dynamic parameters may be received from the PRU through the read request message and the read response message (S1310 to S1340). The PTU may acquire the PRU dynamic parameters at a period of 250 ms.

If this operation is repeated and the PRU detects an error such as over voltage protection (OVP), the PTU transmits a PRU Alert to the PTU through an indication message (S1350). When the PTU receives an indication message including a PRU Alert, it enters a Latch Fault state.

Hereinafter, a scan role and scan procedure used in wireless charging for out-band communication, a mode for reporting a scan result, and messages and parameters used in the scan procedure will be described in detail. Here, the scan rule is to determine who performs the scan between the wireless power transmitter and the at least one wireless power receiver. Table 4 below summarizes the components and features necessary to describe the present document by category.

TABLE 4

| Category | Description |
|---|---|
| Mode | The state in which the device is set to perform a specific operation |
| Procedure | A set of procedures that a device performs to perform a specific function. |
| Message | Actions to pass parameters between devices |
| Parameter | The data value delivered to the other party as a message or the setting value of the device |

Figure 19:
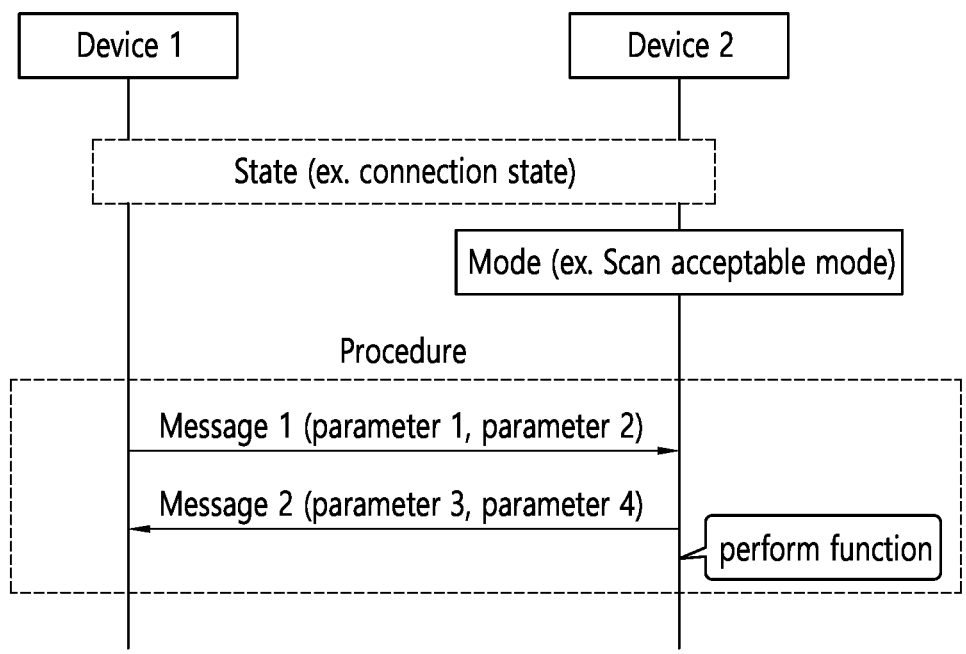
FIG. 19 is a diagram for explaining terms used in the present embodiment.

FIG. 19 is a diagram for explaining terms used in the present embodiment.

Throughout the power transfer procedure and communication procedure, the wireless power transmitter and the wireless power receiver in this embodiment may be defined to operate according to the procedure according to FIG. 19.

Referring to FIG. 19, the first device and the second device operate in a specific state (State). For example, the specific state may include a connection state. Here, the connection state may mean a state in which a communication link between the first device and the second device is established. In this case, the first device may be a wireless power transmitter and the second device may be a wireless power receiver. Alternatively, the first device may be a wireless power receiver and the second device may be a wireless power transmitter. Alternatively, the first device may be a first wireless power receiver and the second device may be a second wireless power receiver.

In the first state, the first device or the second device enters a specific mode (Mode). Here, the specific mode may include a selection mode, an identification and configuration mode, a negotiation mode, a calibration mode, a power transfer mode, a scan acceptable mode, and the like. That is, each phase in FIGS. 5 and 11 may be called a mode.

In a specific mode, a procedure for performing a specific function of wireless power transfer or communication between the first device and the second device may be performed (Procedure). For example, the procedure may include exchanging a first message and a second message. Each message may include parameters that the wireless power transmitter or wireless power receiver wants to transmit to the counterpart device.

Hereinafter, used in this embodiment for out-band communication, scan roles and scan procedures, modes for reporting scan results, and messages and parameters used in scan procedures will be described in detail. Here, the scan rule is to determine who performs the scan between the wireless power transmitter and the at least one wireless power receiver. The components and features necessary to describe the present document are summarized by category as follows.

Scan record: The scan record may refer to result information (eg, device name, identifier, address, service information, etc.) of searching for a peripheral device using BLE. If there are two out-of-band communication modules of the device with the corresponding information, sharing is possible through the scan record sharing message.

Scheduling sharing procedure: When the wireless power receiver operating as the master receives a collision (or retry request) notification from the wireless power transmitter, the wireless power receiver and the wireless power transmitter can perform scheduling sharing and change procedures.

Qi system device identification and service ID: The Qi system device identification and service ID may mean parameters including information indicating that a Qi system related service is provided. Here, the Qi system device may mean a device that has been authenticated with respect to a specific standard (e.g., Qi). When the wireless power receiver receives information about Qi system device identification and service ID, the wireless power receiver can ignore the information or perform separate processing.

Mode Interval: When the wireless power transmitter operates as a scanner or master (that is, when the wireless power receiver operates as an advertiser or slave), the wireless power receiver needs to act as a scanner or master for other Bluetooth operations (e.g., connection to a nearby smart band, etc.) regardless of the wireless power transfer system. Therefore, in this case, the mode (or role) of the wireless power receiver (or Bluetooth module) may be changed. A period in which the mode (or role) is changed in this way may be defined as a mode interval. The wireless power transmitter and the wireless power receiver can exchange and share information about the mode interval based on the mode interval sharing message.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 20:
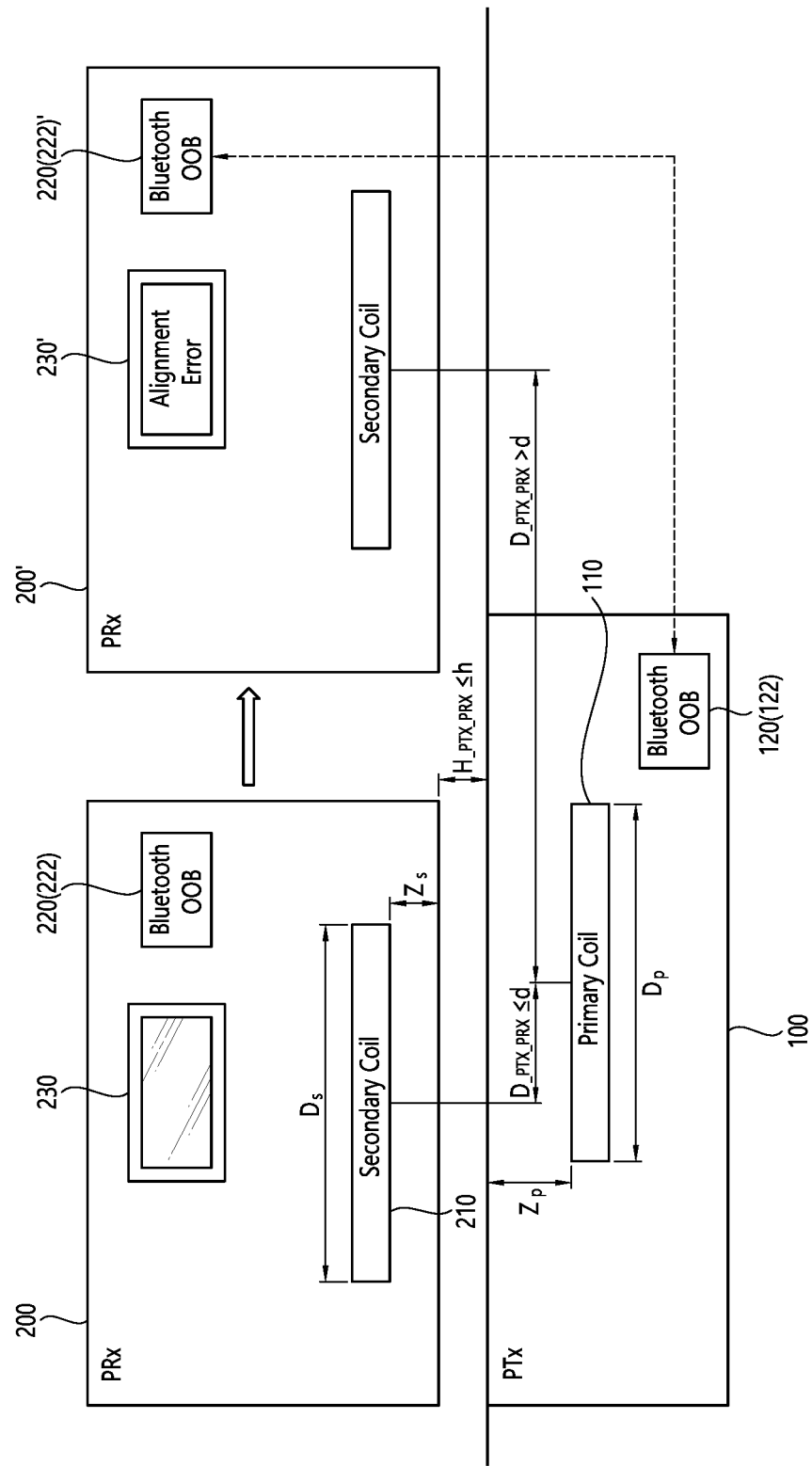
FIG. 20 is a diagram illustrating an example in which misalignment occurs during wireless power transmission.

FIG. 20 is a diagram illustrating an example in which misalignment occurs during wireless power transmission.

As described above, the wireless power receiver 200 exchanges control signals and various information through communication in a state in which it is disposed adjacent to the wireless power transmitter 100, and power transfer is performed.

As shown in FIG. 20, the wireless power transmitter 100 has a primary coil disposed at a position vertically spaced apart from the surface by $z_p$, in the wireless power receiver, a secondary coil is disposed at a position vertically spaced apart by $Z_s$ from the surface. For example, according to WPC, the diameter $D_p$ of the primary coil may be 40 mm or less, and the diameter of the secondary coil may be 50 mm or less. Here, the distance ($D_{PTX\_PRX}$) between the primary coil and the secondary coil central axis is within the maximum allowable distance (d), and if the separation distance ($H_{PTX\_PRX}$) between the wireless power receiver and the wireless power transmitter is within the maximum separation distance (h), wireless power transmission may operate normally. For example, according to the WPC, the maximum allowable distance d may be 0.25 inch.

For example, the maximum allowable distance d may correspond to a maximum distance over which in-band communication is possible, or may be a maximum distance over which wireless power transmission can be made in a normal range.

In general, the existing wireless power receiver and the wireless power transmitter exchange the information by in-band communication. However, since in-band communication has a very narrow communication range, communication is possible only at a very close distance between the wireless power receiver and the wireless power transmitter. Therefore, as shown in FIG. 20, if the wireless power receiver 200 is not correctly placed on the wireless power transmitter 100, or if the distance ($D'_{PTX\_PRX}$) between the central axes between the coils is out of the maximum allowable distance (d) due to the user's carelessness and the wireless power receiver moves unintentionally while charging, information exchange through in-band communication may not be possible. In this case, it is difficult to obtain information about the charging state, the cause of the error, and the like of the wireless power receiver.

Accordingly, the communication/control unit 220 of the wireless power receiver of this embodiment and the communication/control unit 120 of the wireless power transmitter include out-band communication units 122 and 222, both in-band communication and out-band communication may be configured to be possible. And, it is configured to exchange various information related to charging through out-band communication. As described above, out-band communication has a wider communication range than in-band communication. Even in a state where in-band communication is impossible, the wireless power receiver 200 and the transmitter 100 can communicate through out-band communication. Therefore, according to the present embodiment, even in a state where misalignment of the wireless power receiver occurs as shown in FIG. 20, it is possible to check the charging state or information about the charging state change from the wireless power transmitter through out-band communication.

In addition, the wireless power receiver 200 and the wireless power transmitter 100 may check distance information between the wireless power receiver and the wireless power transmitter using out-band communication between the two devices. For example, using a Received Signal Strength Indicator (RSSI) during out-band communication between two devices, it is possible to check whether the wireless power receiver moves and distance information based on the RSSI change of out-band communication.

Meanwhile, whether the wireless power receiver 200 is misaligned may be determined by the wireless power transmitter 100. The wireless power receiver 200 may determine whether there is a misalignment by comparing the measured parameter for determining whether there is a misalignment with a reference parameter.

As an example, a parameter for determining misalignment may be a quality factor.

Accordingly, the communication/control unit 120 of the wireless power transmitter may determine whether there is a misalignment by comparing the measured quality factor $q_{qf}$ with the reference quality factor $g_{Align}$. Specifically, when the difference between the measured quality factor $q_{qf}$ and the reference quality factor $q_{Align}$ exceeds the quality factor threshold QAlign_Thr, it may be determined that misalignment has occurred.

As another example, the parameter for determining the misalignment may be a peak frequency. Accordingly, the communication/control unit of the wireless power transmitter may determine whether there is a misalignment by comparing the measured peak frequency $f_{rf}$ with the reference peak frequency $f_{Align}$. Specifically, when the difference between the measured peak frequency $f_{rf}$ and the reference peak frequency $f_{Align}$ exceeds the peak frequency threshold $f_{Align\_Thr}$, it may be determined that misalignment has occurred.

The time when the wireless power transmitter 100 measures the above-described parameter and determines whether there is a misalignment based on this may be variously configured according to an embodiment.

For example, if the wireless power transmitter 100 monitors distance information with the wireless power receiver using RSSI during out-band communication, or if the distance of the receiving device exceeds preset criteria, for example, the maximum allowable distance (d), it is possible to determine whether misalignment occurs by measuring the aforementioned parameter ($q_{qf}$ or $f_{rf}$) and comparing it with a reference parameter ($q_{Align}$ or $f_{Align}$) As another example, when the wireless power transmitter transitions to the selection step 510 by a change in the charging state in the above-described power transmission step 560 (see FIG. 5), by measuring the parameter, it is possible to determine whether there is a misalignment. As another example, when wireless power transmission is started, the wireless power transmitter periodically measures the parameter, and it is also possible to determine whether there is a misalignment.

Here, a reference parameter such as a reference quality factor ($q_{Align}$) or a reference peak frequency ($f_{Align}$) may be obtained from the wireless power receiver. As an example, such reference parameter information may be obtained from a packet received through in-band communication from the wireless power receiver in the negotiation phase for initiating wireless power transfer.

In this case, as a parameter for determining the misalignment, any one of a quality factor or a peak frequency may be alternatively used, or it is also possible to use a quality factor and a peak frequency at the same time.

If it is determined that the misalignment of the wireless power receiver 200 has occurred by the above method, the wireless power transmitter 100 stops power transfer, it is connected to the wireless power receiver 200 through out-band communication and can notify the user of the fact that an error such as misalignment occurs. The wireless power receiver 200 is configured to include a display unit 230, when information including an error occurrence fact is received through out-band communication, it may be displayed to the user through the display unit 230. At this time, the display unit 230 may be composed of at least one of a display, an LED, a speaker, and a vibration device, the fact that such a defect has occurred can be delivered to the user by means of a message, LED blinking, voice, or vibration.

Furthermore, the wireless power transmitter 100 may transmit information including the fact that an error has occurred to the separate device 900. The separate device 900 may be a smart phone, a tablet, a smart watch, a TV, or a separate wireless power transmitter. Such a device is configured to support out-band communication and is connected to the wireless power transmitter through out-band communication to receive information including the fact that the error has occurred. The device 900 is also configured to include a display unit 930 like the wireless power receiver, so that the received information can be delivered to the user through the display unit 930. The device 900 may be a device capable of wireless power reception or transmission, but may also be a device that does not support wireless power reception or transmission.

Although it has been described above that the wireless power receiver 200 transmits information including misalignment to the device, it is not limited thereto. The device may be configured to be connected to the wireless power receiver through out-band communication, when the wireless power receiver 200 receives information including the fact that an error has occurred from the wireless power transmitter 100, it is also possible to transmit it back to the device 900 through out-band communication.

Figure 21:
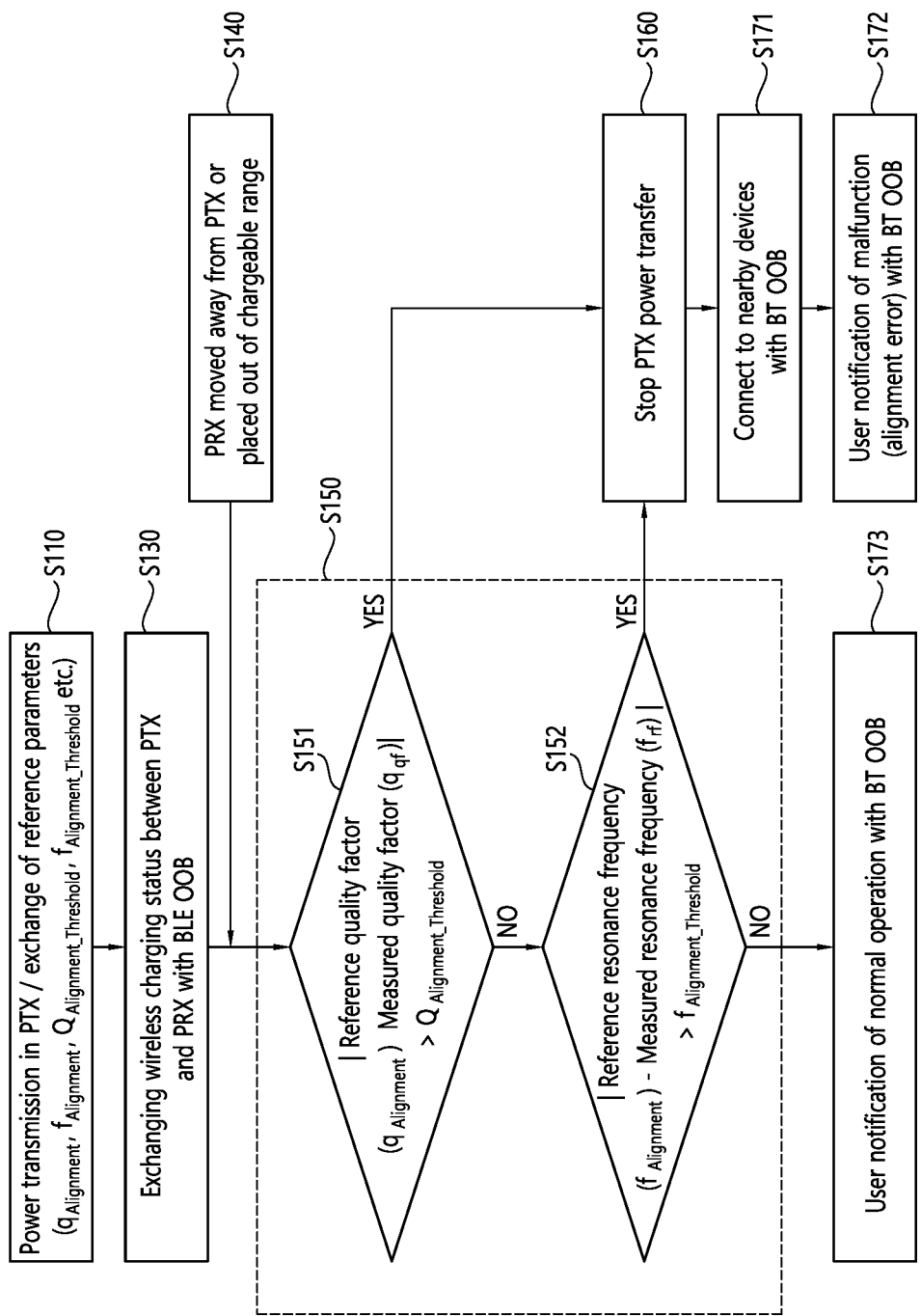
FIG. 21 is a flowchart illustrating a step of detecting the occurrence of misalignment and notifying the user in one embodiment.
Figure 22:
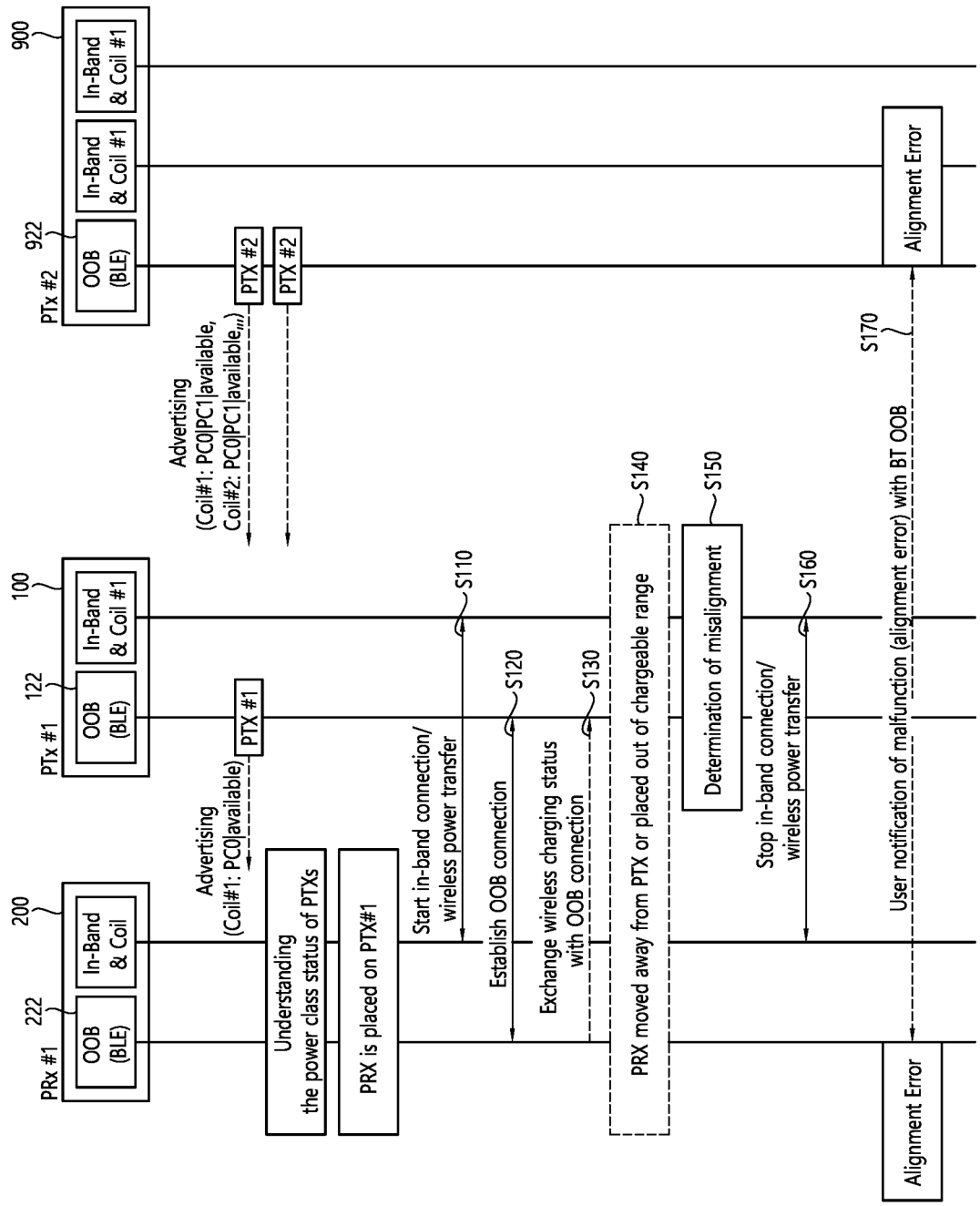
FIG. 22 is a flowchart illustrating the steps of FIG. 21 as steps performed by each device.

FIG. 21 is a flowchart illustrating a step of detecting the occurrence of misalignment and notifying the user in one embodiment, FIG. 22 is a flowchart illustrating the steps of FIG. 21 as steps performed by each device. Hereinafter, with reference to FIGS. 21 and 22, a method of promptly notifying a user when misalignment occurs will be described in detail.

As shown in FIG. 22, in an environment in which a plurality of wireless power transmitters 100 and 900 are provided, each wireless power transmitter performs an advertisement procedure using the BLE out-band communication modules 122 and 922. Then, the wireless power receiver 200 to proceed with charging understands the state of each wireless power transmitter through a discovery procedure and a scanning procedure. The user places the wireless power receiver 200 in the wireless power transfer position by selecting the wireless power transmitter 100 that provides a suitable wireless power transfer environment among them.

The communication/control unit 220 of the wireless power receiver and the communication/control unit 120 of the wireless power transmitter exchange various information using in-band communication and initiate wireless power transfer (S110). Initiation of information exchange and wireless power transfer through in-band communication may follow each step described in FIG. 5. At this time, the exchanged information may include device information and performance information of the wireless power receiver and the wireless power transmitter, information on the reference quality factor ($q_{Align}$) and the quality factor threshold ($Q_{Align\_Thr}$) or the reference peak frequency ($f_{Align}$) and the peak frequency threshold ($f_{Align\_Thr}$) may be further included.

In addition, out-band communication is connected between the wireless power receiver 200 and the wireless power transmitter 100 (S120). Although it is illustrated that out-band communication is connected after the wireless power transfer is started in FIGS. 21 and 22, the present document is not limited thereto, and it is also possible to connect before the wireless power transfer starts.

For example, out-band communication may use BLE communication, and information including a charging state is exchanged between both devices using out-band communication during wireless power transfer (S130). Here, the information exchanged may include charge status information such as the receiving power of the wireless power receiver, charging rate, power transfer phase information, whether the wireless power transmitter can support additional charging, distance between the wireless power transmitter and receiver, alignment state, whether foreign object is detected, etc., in addition to this, device information and performance information such as a supported power class, a maximum power value, and whether a shared mode is supported may be further included. Information exchange using out-band communication can be performed periodically while power transfer is in progress, both devices can perform power transfer while exchanging various types of information including charge status information during wireless power transfer.

On the other hand, while the wireless power transfer is in progress through the above steps, as the location of the wireless power receiver is moved or changed due to the user's carelessness, etc., an error situation may occur due to misalignment, etc. (S140). In particular, if the distance ($D_{PTX\_PRX}$) between the two devices is out of the maximum allowable distance due to the movement of wireless power transfer, normal wireless power transfer may not be possible or information exchange through in-band communication may not be possible.

The wireless power transmitter 100 may detect whether the wireless power receiver 200 moves, and may perform a step of determining whether there is a misalignment (S150). At this time, whether the wireless power receiver moves, as described above, can be detected using RSSI of out-band communication or based on a separate positioning technology. As an example, if it is detected that the distance ($D_{PTX\_PRX}$) between the coils of both devices exceeds a preset criteria, for example, the maximum allowable distance (d), the wireless power transmitter 100 may perform a step of determining the misalignment (S150). Or, when it is detected that the vertical separation distance ($H_{PTX\_PRX}$) of both devices exceeds the maximum separation distance (h), the wireless power transmitter may perform a step of determining the misalignment (S150).

As described above, the misalignment may be determined by comparing the measured parameter with the reference parameter. This determination is performed in the wireless power transmitter 100, specifically, it may be performed in the communication/control unit 120 of the wireless power transmitter. When the position movement of the wireless power receiver is detected through the preceding steps, the communication/control unit 120 measures a parameter for determining the alignment state, whether or not misalignment is determined according to whether a difference between the measured parameter and the reference parameter exceeds a threshold value.

In FIG. 21, an example of using a quality factor and a peak frequency as parameters for misalignment determination is shown. According to FIG. 21, the communication/control unit 120 of the wireless power transmitter acquires information about the reference value and the threshold value for the quality factor and the peak frequency in step S110 described above, when the movement of the wireless power receiver by step S140 is detected, a measurement value for each is measured in step S150.

Specifically, if measurements are made for the quality factor ($q_{qf}$) and the peak frequency (frf), first, it is determined whether there is a misalignment based on the quality factor (S151). It is determined whether the difference between the reference quality factor ($q_{Align}$) and the measured quality factor ($q_{qf}$) exceeds the quality factor threshold ($Q_{Align\_Thr}$). At this time, if the difference value exceeds the quality factor threshold ($q_{Align\_Thr}$), it is determined that misalignment has occurred, the power transfer of the wireless power transmitter is stopped (S160).

On the other hand, if the difference value in the aforementioned step S151 does not exceed the quality factor threshold, it is determined whether there is a misalignment based on the peak frequency (S152). It is determined whether the difference between the reference peak frequency $f_{Align}$ and the measured peak frequency $f_{rf}$ exceeds the peak frequency threshold $f_{Align\_Thr}$. At this time, if the difference value exceeds the peak frequency threshold ($f_{Align\_Thr}$), it is determined that misalignment has occurred, the power transfer of the wireless power transmitter is stopped (S160).

In FIG. 21, it is shown that the misalignment is first determined based on the quality factor among the two parameters, it is not limited to this order, and it is also possible to first determine whether there is a misalignment based on the peak frequency. In addition, in FIG. 21, when the difference between the measured value and the reference value in any one of the two parameters exceeds the threshold, it is determined that there is a misalignment, but is not limited thereto. When the difference between the measured value and the reference value of both parameters exceeds the threshold, it is also possible to determine that it is misaligned. In addition, in FIG. 21, the misalignment is determined based on two parameters, by omitting any one of the steps S151 and S152, it is also possible to determine based on any one parameter of the quality factor or the peak frequency.

In addition, in the above description, when the movement of the wireless power receiver is detected using RSSI of out-band communication, it is described as measuring the parameter and determining whether there is a misalignment based thereon, but the present document is not limited thereto. If the phase of the wireless power transmitter during wireless power transfer, not the RSSI-based movement detection, transitions from the power transfer stage to the selection stage, it is also possible to determine that an error has occurred, measure the above-mentioned parameters, and perform misalignment determination. Or, when a change in the wireless power receiver's own parameter (for example, a change in capacitance constituting the power conversion circuit, change in inductance, etc.) is detected, the wireless power transmitter may perform a step of determining whether there is a misalignment. Or, rather than measuring the parameter if it corresponds to a specific condition as above, it may also be configured to periodically measure the parameter after power transfer is initiated and periodically determine whether there is a misalignment based on the measurement.

In FIGS. 21 and 22, when a determination is made as to whether the misalignment is made through step S150, in order to quickly notify the user of this, an operation of transmitting the corresponding information using out-band communication is performed (S170).

First, if it is determined that a misalignment has occurred, the communication/control unit 120 of the wireless power transmitter controls to terminate the power transfer through in-band communication (S160), it operates to establish a communication connection with a separate device 900 at an adjacent location through out-band communication (S171). This step (S171) is made according to the BLE communication connection method described above, accordingly, even in a state in which in-band communication is impossible due to the occurrence of an error, information including the occurrence of misalignment may be transmitted to the separate device S900. At this time, in order to promptly notify the user of the occurrence of an error, the operation of transmitting the information through the out-band communication may be performed within 500 ms from the time of determining the occurrence of misalignment or the time of controlling the termination of power transfer, more specifically, it may proceed within 200 ms.

Then, the device 900 that receives this information displays the received information to the user through the display unit 930 of the device to notify the fact that the misalignment has occurred (S172). Here, the method of displaying to the user may be delivered using at least one of various methods such as voice notification, vibration notification, LED blinking, and message display.

In FIG. 22, the separate device 900 is illustrated as a separate wireless power transmitter, but is not limited thereto. A separate device may be a wireless power receiver or a device that does not support wireless charging. Such a separate device 900 is possible as long as it has a communication unit connectable through out-band communication and can display transmitted information to a user.

At this time, the information transmitted through out-band communication in S170 and displayed to the user includes information about changes in the charging state, such as the occurrence of errors such as misalignment, in addition to this, it may further include device information such as performance information of the wireless power transmitter and whether additional charging is supported.

On the other hand, as shown in FIG. 22, the wireless power transmitter 100 may also transmit the above-described information to the wireless power receiver 200 in which power transfer is in progress through out-band communication (operation on the left side of S170). The information transmitted to the wireless power receiver 200 includes various information including whether there is a misalignment as described above, the wireless power receiver 200 may display this information to the user in various ways through the display unit 230. At this time, in order to promptly notify the user of the occurrence of an error, the operation of transmitting the information through the out-band communication may be performed within 500 ms from the time of determining the occurrence of misalignment or the time of controlling the termination of power transfer, more specifically, it may proceed within 200 ms.

On the other hand, if it is determined that the misalignment does not occur through the step (S150) of determining whether the misalignment has occurred, the wireless power transmitter 100 transmits this information to the wireless power receiver through out-band communication, the wireless power receiver may display that a normal operation is being performed to the user through the display unit (S173).

In FIG. 22, although the wireless power transmitter shows an example of transmitting information on the occurrence of misalignment to a single device other than the wireless power receiver, the present document is not limited thereto. It is also possible for the wireless power transmitter to transmit the corresponding information to a plurality of separate devices through out-band communication.

In addition, although FIG. 22 shows that the wireless power transmitter transmits the information to a separate device through out-band communication in step S170, the present document is not limited thereto. As the wireless power receiver is connected to a separate device through out-band communication, it is also possible to transmit the information received from the wireless power transmitter to the device to display it.

Figure 23:
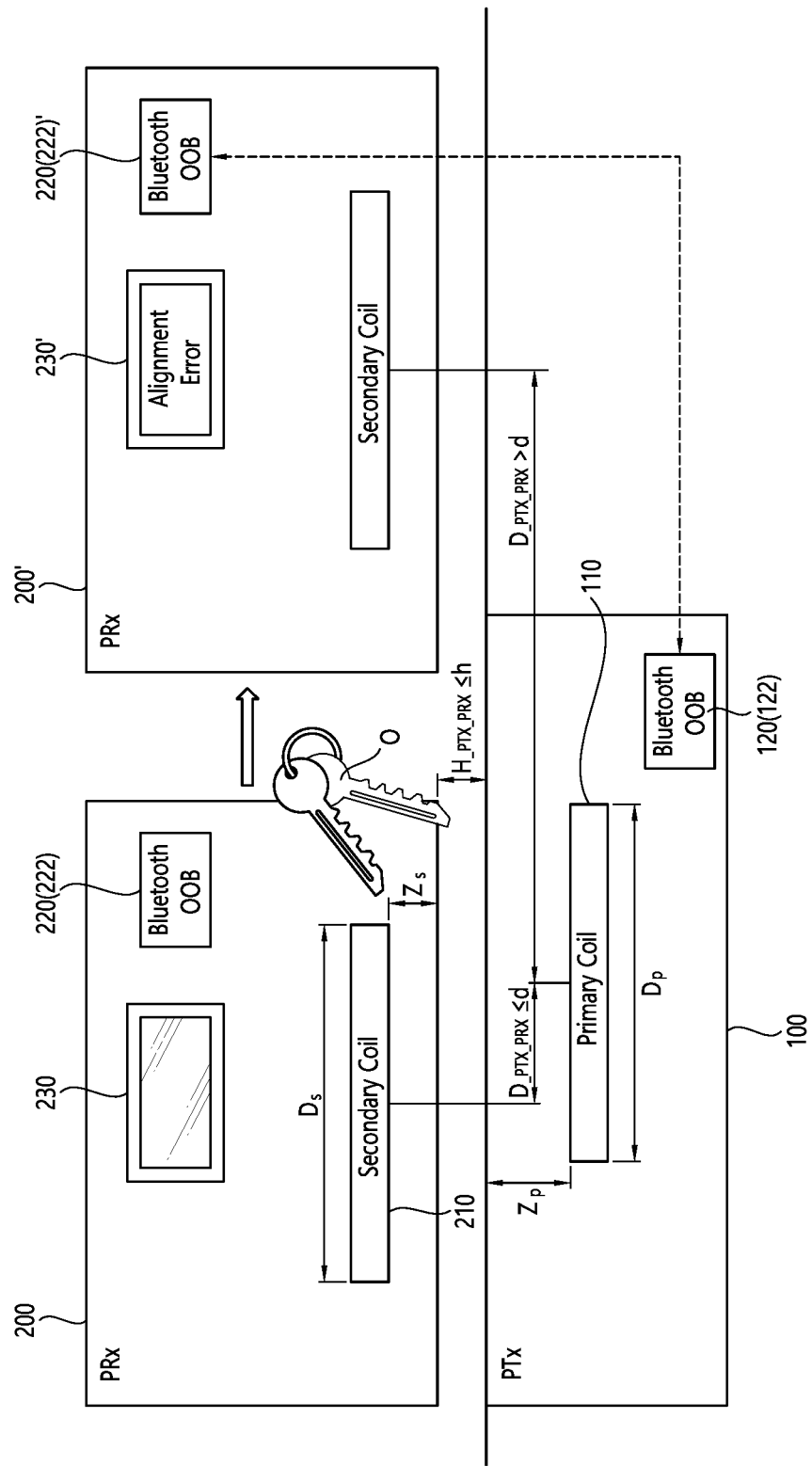
FIG. 23 is a diagram illustrating an example in which foreign object detection occurs during wireless power transfer.

FIG. 23 is a diagram illustrating an example in which foreign object detection occurs during wireless power transfer. In the above-described FIGS. 20 to 22, the description was focused on a situation in which an error occurs due to misalignment of the wireless power receiver during power transfer, in addition to this, it is possible that an error may occur as a foreign object is placed on the wireless power transmitter during power transfer. Hereinafter, operations of the wireless power transmitter and the receiver when a foreign object is detected in this embodiment will be described in detail with reference to FIG. 23. However, since it is only a difference in the cause of the error compared to FIG. 20 described above, descriptions of the same configuration and technical features are replaced with those described above with reference to FIG. 20.

In general, the existing wireless power receiver uses in-band communication, it is determined whether a foreign object is detected using system parameters (e.g., changes in power, current, transmission efficiency, resistance, inductance, and capacitor) initially set before foreign object detection. However, if a foreign object (0) such as a metal material is placed due to the user's carelessness during wireless power transfer, it is not easy to detect it. In particular, if the position of the wireless power transmitter moves due to the arrangement of the foreign object and the distance ($D'_{PTX\_PRX}$) between the central axes of the coil is out of the maximum allowable distance (d), information exchange through in-band communication may not be possible. In this case, it is difficult to grasp information on the charging state of the wireless power receiver, the cause of the error, etc.

Therefore, in the embodiment of FIG. 23, as in FIG. 20, the communication/control unit 220 of the wireless power receiver and the communication/control unit 120 of the wireless power transmitter of this embodiment are configured to exchange various information related to charging through out-band communication. Therefore, even in a state where foreign object detection (FOD) occurs on the wireless power transmitter, through out-band communication, it is possible to check the charging state or information about the charging state change from the wireless power transmitter.

Here, each step of determining whether foreign object detection has occurred and transmitting the corresponding information to the wireless power receiver and a separate device through out-band communication and displaying the information to the user is performed in a manner similar to the embodiment described in FIG. 20. Accordingly, the description of the similar steps will be replaced with the description of FIG. 20, and the following will focus on the step of determining whether a foreign object is detected.

Whether such a foreign object is detected may be determined by the wireless power transmitter 100. The wireless power receiver 200 may determine whether a foreign object is detected by comparing the measured parameter with a reference parameter to determine whether a foreign object is detected.

As an example, a parameter for determining foreign object detection (FOD) may be a quality factor. Accordingly, the communication/control unit 120 of the wireless power transmitter may determine whether a foreign object is detected by comparing the measured quality factor qqf with the reference quality factor qAlign. Specifically, when the difference between the measured quality factor qqf and the reference quality factor qFOD exceeds the quality factor threshold QFOD_Thr, it may be determined that the foreign object is detected.

As another example, a parameter for determining foreign object detection may be a peak frequency. Accordingly, the communication/control unit of the wireless power transmitter may determine whether a foreign object is detected by comparing the measured peak frequency frf with the reference peak frequency fFOD. Specifically, when the difference between the measured peak frequency frf and the reference peak frequency fFOD exceeds the peak frequency threshold fFOD_Thr, it may be determined that foreign object detection has occurred.

Here, it is possible to determine whether a foreign object is detected based on the quality factor information, it is also possible to determine whether a foreign object is detected based on the peak frequency information, it is also possible to determine whether a foreign object is detected in consideration of both the quality factor information and the peak frequency information.

Here, a reference quality factor ($q_{FOD}$), a quality factor threshold (QFOD_Thr), a reference peak frequency (fFOD), and a peak frequency threshold (fFOD_Thr) for determining whether a foreign object is detected may be different value from a reference quality factor (qAlign), a quality factor threshold (QAlign_Thr), a reference peak frequency (fAlign), a peak frequency threshold (fAlign_Thr) for determining whether there is misalignment in FIG. 20, respectively.

However, it is not limited thereto, the reference quality factor (qFOD) and the reference peak frequency (fFOD) for determining whether a foreign object is detected are the same as the reference quality factor (qAlign) and the reference peak frequency (fAlign) for determining whether there is a misalignment, respectively, and the quality factor threshold and the peak frequency threshold may be different for each purpose (QFOD_Thr≠QAlign_Thr or fFOD_Thr≠fAlign_Thr).

Here, the procedure for receiving the reference parameter and parameter threshold information, and the procedure for measuring the parameter and determining whether a foreign object is detected using the measured parameter may be the same as the procedure performed to determine the misalignment in FIG. 20.

Furthermore, the above description is focused on an example of using a measurement parameter and a reference parameter as a method of determining whether a foreign object is detected, in addition to this, it is also possible to determine whether a foreign object is detected by comparing the transmission power (Ptx) transmitted from the wireless power receiver 200 and the reception power (Prx) received from the wireless power receiver 200 to compare whether a foreign object is detected.

Specifically, the wireless power transmitter 100 communicates with the wireless power receiver through out-band communication, and may receive charging state information such as received power and charging rate from the wireless power receiver 200 during power transfer. And, the power threshold (PFOD_Thr) for determining foreign object detection may be provided along with other reference parameters (qFOD, fFOD, qAlignment, fAlignment) and parameter thresholds (QFOD_Thr, fFOD_Thr, QAlign_Thr, fAlign_Thr) information through in-band communication at the stage when power transfer is initiated. Here, the power threshold (PFOD_Thr) may be 300 mW in the case of Basic Power Profile, for Extended Power Profile, it may be 750 mW. And, when the difference between the power (Ptx) transmitted through the wireless power transmitter and the power (Prx) received from the wireless power receiver exceeds the power threshold (PFOD_Thr), the communication/control unit 120 of the wireless power transmitter may determine that foreign object detection has occurred.

Figure 24:
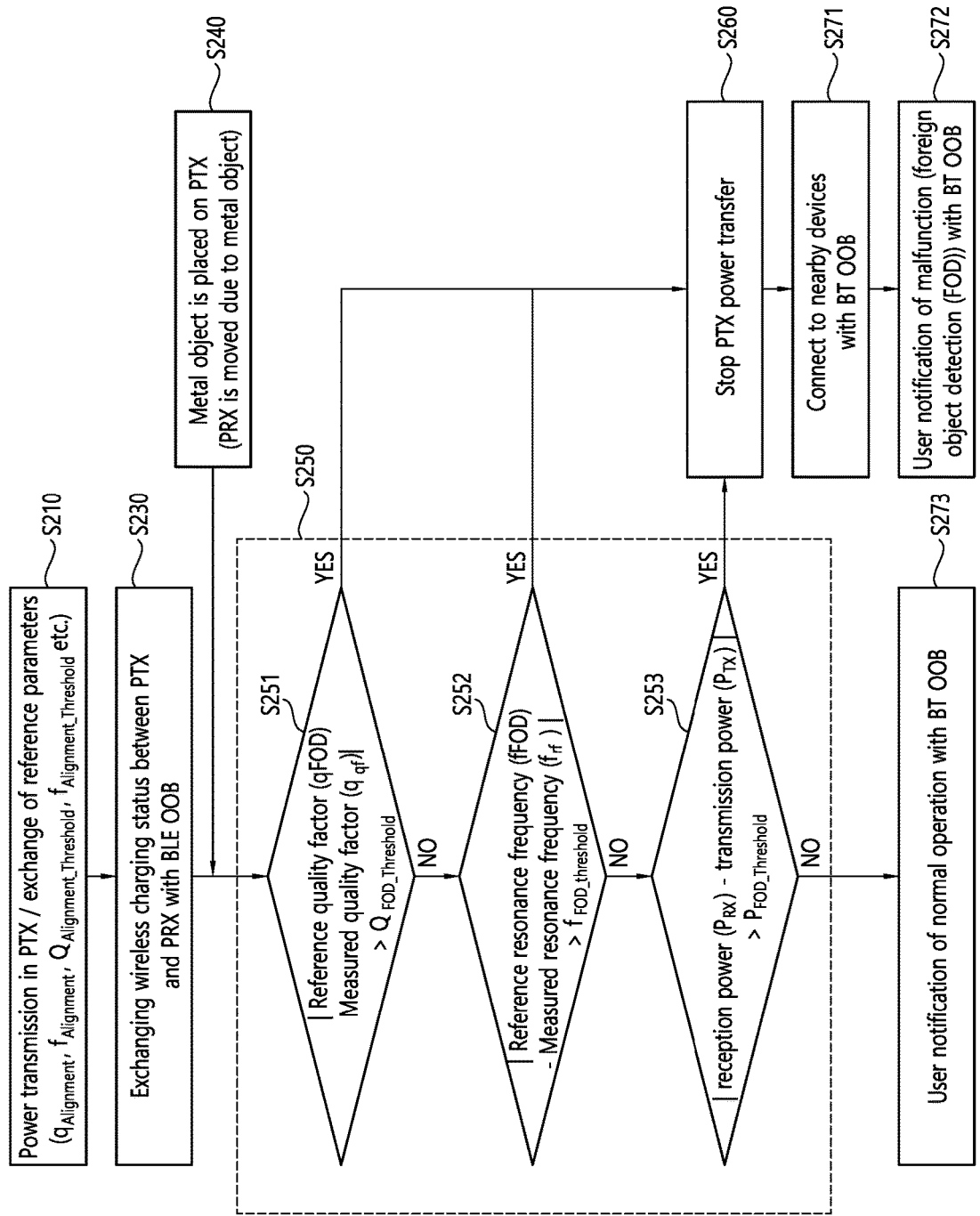
FIG. 24 is a flowchart illustrating a step of detecting whether a foreign object is detected and notifying a user in one embodiment.
Figure 25:
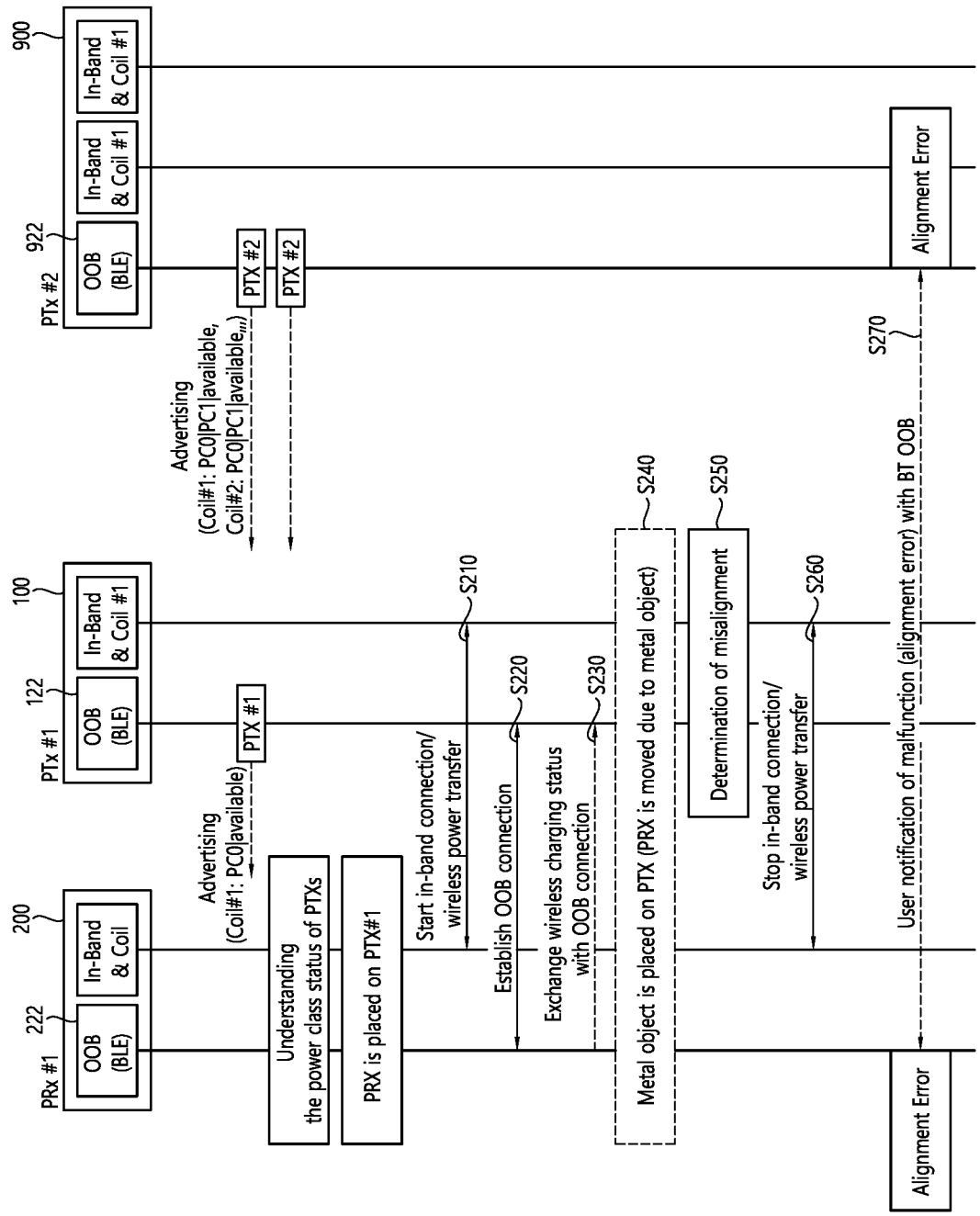
FIG. 25 is a flowchart illustrating the steps of FIG. 24 as steps performed by each device.

FIG. 24 is a flowchart illustrating a step of detecting whether a foreign object is detected and notifying a user in one embodiment, FIG. 25 is a flowchart illustrating the steps of FIG. 24 as steps performed by each device. Hereinafter, with reference to FIGS. 24 and 25, a method of promptly notifying a user when a foreign object is detected will be described in detail.

As shown in FIG. 25, in an environment in which a plurality of wireless power transmitters 100 and 900 are provided, each wireless power transmitter performs an advertisement procedure using the BLE out-band communication modules 122 and 922. Then, the wireless power receiver 200 to proceed with charging understands the state of each wireless power transmitter through a discovery procedure and a scanning procedure. The user places the wireless power receiver 200 in the wireless power transfer position by selecting the wireless power transmitter 100 that provides a suitable wireless power transfer environment among them.

The communication/control unit 220 of the wireless power receiver and the communication/control unit 120 of the wireless power transmitter exchange various information using in-band communication and initiate wireless power transfer (S210). Initiation of exchange of information and wireless power transfer through in-band communication may follow each step described in FIG. 5. At this time, the exchanged information may include device information and performance information of the wireless power receiver and the wireless power transmitter, information on the reference quality factor (qFOD) and the quality factor threshold (QFOD_Thr) or the reference peak frequency (fFOD) and the peak frequency threshold (fFOD_Thr) or the power threshold (PFOD_Thr) may be further included.

In addition, out-band communication is connected between the wireless power receiver 200 and the wireless power transmitter 100 (S220). FIGS. 24 and 25 show that out-band communication is connected after the wireless power transfer is started, but the present document is not limited thereto, and it is also possible to connect before the wireless power transfer starts.

As an example, out-band communication may use BLE communication, during wireless power transfer, information including the charging state is exchanged between the two devices using out-band communication (S230). Here, the information exchanged may include receiving power (Prx) of the wireless power receiver, filling rate, power transfer phase information, whether the wireless power transmitter can support additional charging, the distance between the wireless power transmitter and receiver, sort status, charging status information such as foreign object detection. In addition to this, device information and performance information such as a supported power class, a maximum power value, and whether a shared mode is supported may be further included. Information exchange using out-band communication can be performed periodically while power transfer is in progress, both devices can perform power transfer while exchanging various types of information including charge status information during wireless power transfer.

On the other hand, while the wireless power transfer is in progress through the above steps, a foreign object made of metal is placed on the wireless power receiver due to user's carelessness, etc., or as such a foreign object is disposed, an error situation may occur as the location of the wireless power receiver moves (S240). In particular, if the distance between the two devices (D_PTX_PRX) is out of the maximum allowable distance due to the movement of wireless power transfer, normal wireless power transfer may not be possible, or information exchange through in-band communication may not be possible.

Therefore, the wireless power transmitter 100 detects whether a foreign object placement possibility or the wireless power receiver 200 moves, it may perform a step of determining whether a foreign object is detected (S250). In this case, the possibility of foreign object placement or the movement of the wireless power receiver can be detected using RSSI of out-band communication or based on a separate positioning technology as described above. As an example, if it is detected that the distance (D_PTX_PRX) between the coils of both devices exceeds the preset criteria, the maximum allowable distance (d), the wireless power transmitter 100 may perform a step of determining whether a foreign object is detected (S250). Or, when it is detected that the vertical separation distance (H_PTX_PRX) of both devices exceeds the maximum separation distance (h), the wireless power transmitter may perform a step of determining whether a foreign object is detected (S250).

As described above, whether the foreign object is detected may be determined by comparing the measured parameter with the reference parameter. This determination is performed in the wireless power transmitter 100, specifically, it may be performed in the communication/control unit 120 of the wireless power transmitter. When the position movement of the wireless power receiver is detected through the preceding steps, the communication/control unit 120 measures a parameter for determining whether a foreign object is detected, it is determined whether a foreign object is detected according to whether the difference between the measured parameter and the reference parameter exceeds a threshold.

FIG. 24 shows an example of using a quality factor and a peak frequency as parameters for determining foreign object detection. According to FIG. 24, the communication/control unit 120 of the wireless power transmitter acquires information about the reference value and the threshold value for the quality factor and the peak frequency in the above-described step S210, when the movement of the wireless power receiver is detected by step S240, a measurement value for each is measured in step S250.

Specifically, when measurements are made for the quality factor (qqf) and the peak frequency (frf), first, it is determined whether a foreign object is detected based on the quality factor (S251). This is determined by whether the difference between the reference quality factor (qFOD) and the measured quality factor (qqf) exceeds the quality factor threshold (QFOD_Thr). At this time, if the difference value exceeds the quality factor threshold (QFOD_Thr), it is determined that a foreign object is detected, the power transfer of the wireless power transmitter is stopped (S260).

On the other hand, if the difference value in the aforementioned step S251 does not exceed the quality factor threshold, it is determined whether a foreign object is detected based on the peak frequency (S252). This is determined by whether the difference between the reference peak frequency fFOD and the measured peak frequency frf exceeds the peak frequency threshold fFOD_Thr. At this time, if the difference value exceeds the peak frequency threshold (fFOD_Thr), it is determined that a foreign object is detected, the power transfer of the wireless power transmitter is stopped (S260).

If the difference value in the above-described step S252 does not exceed the quality factor threshold, it is determined whether a foreign object is detected based on the power transfer ratio (S253). The communication/control unit of the wireless power transmitter determines whether the difference between the power (Ptx) transmitted to the wireless power receiver and the received power (Prx) of the wireless power receiver periodically provided through out-band communication exceeds the power threshold (PFOD_Thr). At this time, if the difference value exceeds the power threshold, it is determined that a foreign object is detected, and power transmission of the wireless power transmitter is stopped (S260).

In FIG. 24, based on the quality factor, peak frequency, and power transfer rate, respectively, although the steps of determining whether a foreign object is detected are sequentially shown, it is not limited to this order, and it is also possible to proceed in a changed order. In addition, in FIG. 24, if any one of the three determination procedures exceeds a threshold, it is determined that a foreign object is detected, but the present document is not limited thereto. It is also possible to determine that a foreign object is detected when a threshold is exceeded in at least two or all three determination procedures. In addition, in FIG. 24, an example of using all three determination methods to determine whether a foreign object is detected is shown, it is also possible to omit some of the three determination methods and determine whether a foreign object is detected with only one or two steps.

In addition, in the above description, when the movement of the wireless power receiver is detected using RSSI of out-band communication, it is described as measuring the parameter and determining whether a foreign object is detected based on this, the present document is not limited thereto. Rather than moving detection based on RSSI, during wireless power transfer, when the phase of the wireless power transmitter transitions from the power transfer stage to the selection stage, it is determined that an error has occurred and the aforementioned parameters are measured, it is also possible to determine whether a foreign object is detected. Or, when a change in the wireless power receiver's own parameter (for example, a change in capacitance constituting the power conversion circuit, change in inductance, etc.) is detected, the wireless power transmitter may perform a step of determining whether a foreign object is detected. Furthermore, rather than measuring the parameter if it corresponds to a specific condition as above, it is also possible to measure the parameter periodically after power transfer is initiated and to periodically determine whether a foreign object is detected based on the measurement.

In FIGS. 24 and 25, if it is determined whether a foreign object is detected through step S250, in order to quickly notify the user of this, an operation of transmitting the corresponding information using out-band communication is performed (S270).

First, if it is determined that foreign object detection has occurred, the communication/control unit 120 of the wireless power transmitter controls to end power transfer through in-band communication (S260), it operates to establish a communication connection with a separate device 900 at an adjacent location through out-band communication (S271). This step (S271) is made according to the BLE communication connection method described above, accordingly, even in a state in which in-band communication is impossible due to the occurrence of an error, information including whether a foreign object has been detected may be transmitted to the separate device S900. At this time, in order to promptly notify the user of the occurrence of an error, the operation of transmitting the information through the out-band communication may be performed within 500 ms from the time of determining whether a foreign object is detected or the time of controlling the end of power transfer, more specifically, it may proceed within 200 ms.

Then, the device 900 that receives this information displays the received information to the user through the display unit 930 of the device to notify the fact that the foreign object has been detected (S272). Here, the method of displaying to the user may be delivered using at least one of various methods such as voice notification, vibration notification, LED blinking, and message display.

Although the separate device 900 is illustrated as a separate wireless power transmitter in FIG. 25, the present document is not limited thereto. A separate device may be a wireless power receiver or a device that does not support wireless charging. Such a separate device 900 is possible as long as it has a communication unit connectable through out-band communication and can display transmitted information to a user.

At this time, the information transmitted through out-band communication in S270 and displayed to the user includes information on changes in the charging state such as error occurrence such as foreign object detection, in addition to this, it may further include device information such as performance information of the wireless power transmitter and whether additional charging is supported.

On the other hand, as shown in FIG. 25, the wireless power transmitter 100 may also transmit the above-described information to the wireless power receiver 200 in which power transfer is in progress through out-band communication (operation on the left side of S270). The information transmitted to the wireless power receiver 200 includes various information including whether foreign objects are detected as described above, the wireless power receiver 200 may display this information to the user in various ways through the display unit 230. At this time, in order to promptly notify the user of the occurrence of an error, the operation of transmitting the information through the out-band communication may proceed within 500 ms, and more specifically, within 200 ms from the time of determining the detection of a foreign object or the time of controlling the end of power transfer.

On the other hand, if it is determined that the foreign object does not exist through the step S250 of determining whether the foreign object is detected, the wireless power transmitter 100 transmits this information to the wireless power receiver through out-band communication, the wireless power receiver may display that a normal operation is being performed to the user through the display unit (S273).

In FIG. 25, an example in which the wireless power transmitter transmits information on whether a foreign object is detected to a single device other than the wireless power receiver is illustrated, but the present document is not limited thereto. It is also possible for the wireless power transmitter to transmit the corresponding information to a plurality of separate devices through out-band communication.

In addition, although FIG. 25 shows that the wireless power transmitter transmits the information to a separate device through out-band communication in step S270, the present document is not limited thereto. It is also possible to configure the wireless power receiver to be connected to a separate device through out-band communication and to display the information by transmitting the information received from the wireless power transmitter to the device.

Above, an example in which an error situation that occurs after the start of wireless power transfer is immediately delivered to the user using out-band communication has been described. However, in the above description, a case where an error occurs due to misalignment (FIGS. 20 to 22) and a case where an error occurs due to foreign object arrangement (FIGS. 23 to 25) are separately described, it is also possible that each corresponding step in each case proceeds as a common step and is configured to be able to cope with two types of errors.

For example, steps S110 and S210 may be performed as one step, and each of steps S120 and S130 may be performed as one step with steps S220 and S230, respectively.

In addition, when a change in the state of charge occurs as in steps S140 and S240, it is detected, and by performing steps S150 and S250, respectively, it is possible to determine whether an error has occurred and the cause of the error.

And, the state change information determined through steps S150 and S250 may be transmitted to the wireless power receiver or a separate device by the method described in S170 and S270 to inform the user of whether an error has occurred and the cause of the error.

In addition, in the embodiment described with reference to FIGS. 20 to 25, it is determined whether there is a misalignment or whether a foreign object is detected, although it is described that such information is transmitted through out-band communication when misalignment or foreign object detection occurs, it is not limited thereto. Even if the difference between the parameter and the reference parameter measured in the determination steps S150 and S250 does not exceed the threshold, when the difference value is close to the threshold (e.g., 80% or more of the threshold) or the measurement parameter is measured as out of a preset range compared to the reference parameter, it can be expected that the power transfer efficiency is in a degraded state. Therefore, even in this case, the wireless power transmitter transmits the information to the wireless charging receiver or a separate device through out-band communication to notify the user, it may induce the user to check the charging status again.

On the other hand, in FIGS. 20 to 25, the description is focused on an example of displaying to the user whether misalignment or foreign object is detected, the present document is not limited thereto. As described above, the wireless power transmitter and the receiver exchange various information about the charging state through out-band communication even in a state where misalignment and foreign object detection are not confirmed (see S130 and S230). Therefore, even if misalignment or foreign object detection does not occur, when the wireless power receiver (or wireless power receiver) considers the reception power of the wireless power receiver, when the transmission efficiency is lowered to a preset standard, or when information that needs to be notified to the user is received, such as when the distance of the wireless power receiver changes from the initial position, it is also possible to transmit this to a wireless power receiving apparatus or a separate device through out-band communication to notify the user. In this case, even if there is no error such as misalignment or foreign object detection, it is possible for the user to improve the charging environment by recognizing that the charging efficiency is low and adjusting the location of the wireless power receiver. FIG. 26 is a diagram illustrating an example of displaying information generated in each wireless power transfer system to a user during power transfer according to an embodiment. As shown in FIG. 26, a first wireless power receiver 200*a* is disposed in the first wireless power transmitter 100*a*, a second wireless power receiver 200*b* is disposed in the second wireless power transmitter 100*b*, a third wireless power receiver 200*c* is disposed in the third wireless power transmitter 100*c*.

Here, the first wireless power receiver 200*a* is in a state in which misalignment occurs due to positional movement or the like. Therefore, the first wireless power transmitter 100*a* detects whether there is a misalignment through the above-described method and delivers the fact that the misalignment has occurred to the first wireless power receiver 200*a* through out-band communication, this may be notified to the user through the display unit 230*a*.

Here, the second wireless power receiver 200*b* is in a state in which an error occurs because a metal foreign object (0) such as a key is disposed. Therefore, the second wireless power transmitter 100*b* checks whether a foreign object is detected through the above-described method, by delivering the fact of foreign object detection to the second wireless power receiver 200b through out-band communication, this may be notified to the user through the display unit 230b of the second wireless power receiver.

In addition, the third wireless power receiver 200c is in a state in which power transfer is normally performed without a separate error occurring on the third wireless power transmitter 100c. Therefore, the third wireless power transmitter 100c confirms that a separate error does not occur through the above-described method, the normal operation progress status may be displayed to the user through the display unit 230c.

Furthermore, as well as the first to third wireless power receivers 200a, 200b, and 200c, respectively, the first to third wireless power transmitters 100a, 100b, and 100c may also be connected to a separate device 900 through out-band communication. Therefore, the first to third wireless power transmitters 100a, 100b, and 100c transmit charging information or charging state change information to the device 900 through out-band communication, charging state information and error information of a plurality of wireless power transmitters may be displayed to the user through the display unit 930 of the device.

However, in FIG. 26, the wireless power receivers 200a, 200b, 200c and the separate device 900 are shown as displaying only information on whether an error occurs and whether an error occurs and whether a normal operation is performed. Each wireless power transmitter may include information such as a power class, a charging state, and whether additional charging is supported in addition to the corresponding information. Therefore, the wireless power transmitter periodically transmits the information through out-band communication, users can check the charging status information and device information from time to time in addition to whether an error has occurred through the wireless power receiver or a separate device.

The wireless power transmitter in the embodiment described with reference to FIGS. 20 to 26 corresponds to the wireless power transmitter or the wireless power transmission device or power transfer unit disclosed in FIGS. 1 to 15. Accordingly, the operation of the wireless power transmitter in this embodiment is implemented by one or a combination of two or more of the respective components of the wireless power transmitter in FIGS. 1 to 15. For example, in the present embodiment, data (or packet or signal) processing, transmission, and reception operations by the wireless power transmitter may be performed by the communication/control unit 120.

In addition, the wireless power receiver in this embodiment described with reference to FIGS. 20 to 26 corresponds to the wireless power receiving device or the wireless power receiver or the power receiving unit disclosed in FIGS. 1 to 15. Accordingly, the operation of the wireless power receiver in this embodiment is implemented by one or a combination of two or more of each of the components of the wireless power receiver in FIGS. 1 to 15. For example, in the present embodiment, data (or packet or signal) processing, transmission, and reception operations by the wireless power receiver may be performed by the communication/control unit 220.

Since the wireless power transmission method and apparatus, or the reception apparatus and method according to the embodiment of the present specification described above, not all components or steps are essential, an apparatus and method for transmitting power wirelessly, or an apparatus and method for receiving power may be performed by including some or all of the above-described components or steps. In addition, the above-described wireless power transmission apparatus and method, or the embodiment of the reception apparatus and method may be performed in combination with each other. In addition, each component or step described above does not necessarily have to be performed in the order described, it is also possible that the steps described later are performed prior to the steps described earlier.

The above description is merely illustrative of the technical spirit of the present specification, and various modifications and variations will be possible without departing from the essential characteristics of the present specification by those of ordinary skill in the art to which this specification belongs. Accordingly, the embodiments of the present specification described above may be implemented separately or in combination with each other.

Accordingly, the embodiments disclosed in the present specification are for explanation rather than limiting the technical spirit of the present specification, and the scope of the technical spirit of the present specification is not limited by these embodiments. The protection scope of the present specification should be construed by the following claims, and all technical ideas within the scope equivalent thereto should be construed as being included in the scope of the present specification.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A wireless power transmitter comprising:
a power conversion unit configured to transmit a wireless power to a wireless power receiver by magnetic coupling with the wireless power receiver at an operating frequency; and
a communication/control unit configured to communicate with the wireless power receiver using at least one of in-band communication using the operating frequency and out-band communication using a frequency other than the operating frequency,
wherein the wireless power transmitter is configured to:
exchange, with the wireless power receiver through the in-band communication, a reference quality factor, a quality factor threshold, a reference peak frequency and peak frequency threshold;
establish the out-band communication with the wireless power receiver;
detect that the wireless power receiver moved based on a received signal strength indicator (RSSI) of the out-band communication;
based on detecting that the wireless power receiver moved, determine whether a difference between the reference quality factor and a measured quality factor exceeds the quality factor threshold;
based on the difference being equal to or less than the quality factor threshold, determine whether a difference between the reference peak frequency and a measured peak frequency exceeds the peak frequency threshold;

based on the difference exceeding the peak frequency threshold, stop transmitting the wireless power; and transmit, through the out-band communication, information for that the wireless power receiver is misaligned.

2. The wireless power transmitter of claim 1, wherein the wireless power transmitter is configured to transmit the information through the out-band communication in a state of which the in-band communication with the wireless power receiver is impossible.

3. The wireless power transmitter of claim 1, wherein the information includes information for a change in a charging environment that occurs after a transfer of the wireless power to the wireless power receiver is started.

4. The wireless power transmitter of claim 1, wherein the wireless power transmitter is configured to communicate with a device other than the wireless power receiver through the out-band communication, and transmits the information to the device through the out-band communication.

5. The wireless power transmitter of claim 1, wherein the wireless power transmitter is configured to confirm distance information between the wireless power transmitter and the wireless power receiver using the out-band communication.

* * * * *